(12) United States Patent
Urakawa

(10) Patent No.: US 9,648,140 B2
(45) Date of Patent: May 9, 2017

(54) TERMINAL DEVICE, NON-TRANSITORY COMPUTER-READABLE STORAGE MEDIUM STORING COMPUTER PROGRAM FOR TERMINAL DEVICE, AND SYSTEM

(71) Applicant: Yutaka Urakawa, Nagoya (JP)

(72) Inventor: Yutaka Urakawa, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 134 days.

(21) Appl. No.: 14/170,090

(22) Filed: Jan. 31, 2014

(65) Prior Publication Data

US 2014/0258380 A1    Sep. 11, 2014

(30) Foreign Application Priority Data

Mar. 11, 2013 (JP) ................................ 2013-048004

(51) Int. Cl.
*G06F 15/16* (2006.01)
*H04L 29/06* (2006.01)
(Continued)

(52) U.S. Cl.
CPC ............ *H04L 67/42* (2013.01); *H04L 67/322* (2013.01); *H04N 1/00411* (2013.01)

(58) Field of Classification Search
None
See application file for complete search history.

(56) References Cited

U.S. PATENT DOCUMENTS

| 6,567,983 B1* | 5/2003 | Shiimori | H04N 1/00198 |
| | | | 709/203 |
| 2003/0048272 A1* | 3/2003 | Gormish | G06T 3/4023 |
| | | | 345/428 |

(Continued)

FOREIGN PATENT DOCUMENTS

| JP | H11-212914 A | 8/1999 |
| JP | 2003-333538 A | 11/2003 |

(Continued)

OTHER PUBLICATIONS

Bill Slawski, How Do Images Get Ranked In Image Search?, May 1, 2008, SEO by the Sea.*

(Continued)

*Primary Examiner* — Brian P Whipple
(74) *Attorney, Agent, or Firm* — Scully, Scott, Murphy & Presser, P.C.

(57) ABSTRACT

A terminal device may receive server-side display order information transmitted from a server device. The server-side display order information may indicate a server-side display order, designated on a server side, of a plurality of object images included in a display screen displayed on a display unit of the terminal device. A terminal device may store terminal device-side display order information when a predetermined operation is received. The terminal device-side display order information may indicate a terminal device-side display order which is an order different from the server-side display order. A terminal device may display, in the display screen, the plurality of object images: in accordance with the server-side display order when a storage unit of the terminal device is not storing the terminal device-side display order information; and in accordance with the terminal-side display order when the storage unit is storing the terminal device-side display order information.

14 Claims, 27 Drawing Sheets

(51) Int. Cl.
*H04N 1/00* (2006.01)
*H04L 29/08* (2006.01)

(56) References Cited

U.S. PATENT DOCUMENTS

| | | | |
|---|---|---|---|
| 2003/0055739 A1* | 3/2003 | Takaba | G06Q 30/0633 |
| | | | 705/26.8 |
| 2004/0113944 A1* | 6/2004 | Kawamura | H04L 29/06 |
| | | | 715/744 |
| 2008/0097981 A1* | 4/2008 | Williams | G06F 17/30864 |
| 2008/0162437 A1* | 7/2008 | Choi | G06F 17/30265 |
| 2008/0244066 A1* | 10/2008 | Yoshida | H04L 12/2812 |
| | | | 709/224 |
| 2009/0228813 A1 | 9/2009 | Sekiguchi | |
| 2012/0113468 A1 | 5/2012 | Urakawa | |
| 2012/0113469 A1 | 5/2012 | Urakawa | |

FOREIGN PATENT DOCUMENTS

| | | |
|---|---|---|
| JP | 2006-340204 A | 12/2006 |
| JP | 2008-191982 A | 8/2008 |
| JP | 2009-207872 A | 9/2009 |
| JP | 2012-098982 A | 5/2012 |
| JP | 2012-113700 A | 6/2012 |

OTHER PUBLICATIONS

Official Action dated Apr. 5, 2016 received from the Japanese Patent Office in related JP 2013-048004 together with English language translation.

* cited by examiner

FIG. 9A

```
UNIQUE NUMBER: 001
  INSTRUCTION GENRE: UI INSTRUCTION
UI INSTRUCTION INFORMATION
  SCREEN TYPE: LIST
  TITLE: "PLEASE SELECT WHETHER TO USE EXTERNAL SERVICE OR
  FUNCTION OF DEVICE"
  ENTER KEY: VALID PREVIOUS KEY: VALID NEXT KEY: INVALID
  UNIQUE LIST INFORMATION :
    LIST: "EXTERNAL SERVICE", "FUNCTION OF DEVICE"
    SELECTION METHOD, "SELECTION OF ONE CHOICE"
```

FIG. 9B

```
UNIQUE NUMBER: 002
  INSTRUCTION GENRE: UI INSTRUCTION
UI INSTRUCTION INFORMATION
  SCREEN TYPE: LIST
  TITLE: "DO YOU WANT TO USE EXTERNAL SERVICE?"
  ENTER KEY: VALID PREVIOUS KEY: INVALID NEXT KEY: INVALID
  UNIQUE LIST INFORMATION :
    LIST: "YES", "NO"
    SELECTION METHOD, "SELECTION OF ONE CHOICE"
```

FIG. 9C

```
UNIQUE NUMBER: 003
  INSTRUCTION GENRE: UI INSTRUCTION
UI INSTRUCTION INFORMATION
  SCREEN TYPE: LIST
  TITLE: "SELECT SERVICE"
  ENTER KEY: VALID PREVIOUS KEY: INVALID NEXT KEY: INVALID
  UNIQUE LIST INFORMATION :
    LIST: "SERVICE A", "SERVICE B", "SERVICE C", "SERVICE D", "SERVICE E",  ~R0
      "SERVICE F"  ~R1
    SELECTION METHOD, "SELECTION OF ONE CHOICE"
```

FIG. 9D

```
UNIQUE NUMBER: 004
  INSTRUCTION GENRE: UI INSTRUCTION
UI INSTRUCTION INFORMATION
  SCREEN TYPE: LIST
  TITLE: "PLEASE SELECT UPLOAD OR DOWNLOAD"
  ENTER KEY: VALID PREVIOUS KEY: VALID NEXT KEY: INVALID
  UNIQUE LIST INFORMATION :
    LIST: "UPLOAD", "DOWNLOAD"
    SELECTION METHOD, "SELECTION OF ONE CHOICE"
```

FIG. 9E

```
UNIQUE NUMBER: 005
  INSTRUCTION GENRE: UI INSTRUCTION
UI INSTRUCTION INFORMATION
  SCREEN TYPE: MESSAGE
  TITLE: "UPLOAD SERVICE"
  ENTER KEY: INVALID  PREVIOUS KEY: INVALID NEXT KEY: VALID
  UNIQUE MESSAGE INFORMATION :
    MESSAGE: "DO YOU WANT TO USE UPLOAD?"
```

FIG. 9F

```
UNIQUE NUMBER: 006
  INSTRUCTION GENRE: UI INSTRUCTION
UI INSTRUCTION INFORMATION
  SCREEN TYPE: LIST
  TITLE: "PLEASE SELECT WHETHER TO STORE IMAGE DATA IN MEDIUM OR
   TO PRINT IMAGE DATA"
  ENTER KEY: VALID PREVIOUS KEY: VALID NEXT KEY: INVALID
  UNIQUE LIST INFORMATION :
    LIST: "STORE IMAGE DATA IN MEDIUM", "PRINT"
    SELECTION METHOD, "SELECTION OF ONE CHOICE"
```

FIG. 9G

```
UNIQUE NUMBER: 007
  INSTRUCTION GENRE: UI INSTRUCTION
UI INSTRUCTION INFORMATION
  SCREEN TYPE: LIST
  TITLE: "PLEASE SELECT IMAGE DATA"
  ENTER KEY: VALID PREVIOUS KEY: VALID NEXT KEY: INVALID
  UNIQUE LIST INFORMATION :
    (LIST: "FILE NAME 1", "FILE NAME 2", "FILE NAME 3", "FILE NAME 4")
    (IMAGE LIST: "http://xxx.yy.zz/image/Image1.jpg", "http://xxx.yy.zz/image/Image2.jpg",
    "http://xxx.yy.zz/image/Image3.jpg", "http://xxx.yy.zz/image/Image4.jpg")
    SELECTION METHOD, "SELECTION OF ONE OR MORE CHOICES"
```

FIG. 9H

```
UNIQUE NUMBER: 008
  INSTRUCTION GENRE: UI INSTRUCTION
UI INSTRUCTION INFORMATION
  SCREEN TYPE: MESSAGE
  TITLE: "SERVER ERROR"
  ENTER KEY: VALID PREVIOUS KEY: VALID NEXT KEY: INVALID
  UNIQUE MESSAGE INFORMATION :
    (MESSAGE: SETTING INFORMATION "IDENTIFICATION INFORMATION OF ERROR")
```

FIG. 9I

UNIQUE NUMBER: 009
  INSTRUCTION GENRE: FUNCTION OPERATION INSTRUCTION
FUNCTION OPERATION INSTRUCTION INFORMATION :
  OPERATION TYPE: DOWNLOAD
  (PARAMETER: SETTING INFORMATION "DATA NAMES OF IMAGE DATA")
  (PARAMETER: VALUE OF SETTING INFORMATION "STORING-IN-MEDIUM/PRINTING")

FIG. 9J

UNIQUE NUMBER: 010
  INSTRUCTION GENRE: UI INSTRUCTION
UI INSTRUCTION INFORMATION
  SCREEN TYPE: LIST
  TITLE: "PLEASE SELECT WHETHER TO READ MEDIUM OR TO EXECUTE SCANNING"
  ENTER KEY: VALID PREVIOUS KEY: VALID NEXT KEY: INVALID
  UNIQUE LIST INFORMATION :
    LIST: "READ MEDIUM", "SCANNING"
    SELECTION METHOD, "SELECTION OF ONE CHOICE"

FIG. 9K

UNIQUE NUMBER: 011
  INSTRUCTION GENRE: FUNCTION OPERATION INSTRUCTION
FUNCTION OPERATION INSTRUCTION INFORMATION :
  OPERATION TYPE: UPLOAD
  (PARAMETER: VALUE OF SETTING INFORMATION "READING-OF-MEDIUM/SCANNING")

FIG. 9L

UNIQUE NUMBER: 012
  INSTRUCTION GENRE: UI INSTRUCTION
UI INSTRUCTION INFORMATION
  SCREEN TYPE: LIST
  TITLE: "PLEASE SELECT FUNCTION"
  ENTER KEY: VALID PREVIOUS KEY: VALID NEXT KEY: INVALID
  UNIQUE LIST INFORMATION :
    LIST: "SCANNING", "COPYING"
    SELECTION METHOD, "SELECTION OF ONE CHOICE"

FIG. 9M

```
UNIQUE NUMBER: 013
  INSTRUCTION GENRE: UI INSTRUCTION
UI INSTRUCTION INFORMATION
  SCREEN TYPE: INPUT BOX
  TITLE: "COPY RESOLUTION"
  ENTER KEY: VALID PREVIOUS KEY: VALID NEXT KEY: VALID
  UNIQUE INPUT BOX INFORMATION :
    INITIAL VALUE FOR INPUT BOX: "200"
    CHARACTERS CAPABLE OF BEING INPUT: NUMERICAL VALUES
    MAXIMUM NUMBER OF CHARACTERS: 3, MINIMUM NUMBER OF CHARACTERS: 3
```

FIG. 9N

```
UNIQUE NUMBER: 014
  INSTRUCTION GENRE: UI INSTRUCTION
UI INSTRUCTION INFORMATION
  SCREEN TYPE: LIST
  TITLE: "DO YOU WANT TO START COPYING?"
  ENTER KEY: VALID PREVIOUS KEY: INVALID NEXT KEY: INVALID
  UNIQUE LIST INFORMATION :
    LIST: "YES", "NO"
    SELECTION METHOD, "SELECTION OF ONE CHOICE"
```

FIG. 9O

```
UNIQUE NUMBER: 015
  INSTRUCTION GENRE: FUNCTION OPERATION INSTRUCTION
FUNCTION OPERATION INSTRUCTION INFORMATION :
  OPERATION TYPE: COPYING
  (PARAMETER: VALUE OF SETTING INFORMATION "COPY RESOLUTION")
```

FIG.10B

SCREEN TYPE: LIST (IMAGE LIST)

| PLEASE SELECT IMAGE DATA | | | | ENTER |

| ○ | × | △ | □ | △ |
| FIRST FILE NAME | SECOND FILE NAME | THIRD FILE NAME | FOURTH FILE NAME | ▽ |

FIG.10C

SCREEN TYPE: MESSAGE

| SERVER ERROR | NEXT |

COMMUNICATION WITH SERVER HAS FAILED

FIG.10D

SCREEN TYPE: INPUT BOX

| COPY RESOLUTION | PREVIOUS | NEXT | ENTER |

| 200 | 1 | 2 | 3 | 4 | 5 |
| ← | → | 6 | 7 | 8 | 9 | 0 |
| CLEAR |

R31 — UNIQUE NUMBER : 003
UI INSTRUCTION INFORMATION
  UNIQUE LIST INFORMATION :
R32 —   LIST : "SERVICE A", "SERVICE D", "SERVICE B", "SERVICE C",
  "SERVICE E", "SERVICE F"

| FIG.12A |
|---------|
| FIG.12B |

| TEMPLATE INFORMATION | TOUCH PANEL MODEL | NON-TOUCH-PANEL MODEL |
|---|---|---|
| BASIC SCREEN INFORMATION | · INFORMATION REPRESENTING WHICH OF 'LIST' SCREEN, 'INPUT BOX' SCREEN, AND 'MESSAGE' SCREEN<br>· BASIC SCREEN INFORMATION OF EACH OF 'LIST' SCREEN, 'INPUT BOX' SCREEN, AND 'MESSAGE' SCREEN (BITMAP INFORMATION) | · INFORMATION REPRESENTING WHICH OF 'LIST' SCREEN, 'INPUT BOX' SCREEN, AND 'MESSAGE' SCREEN<br>· BASIC SCREEN INFORMATION OF EACH OF 'LIST' SCREEN, 'INPUT BOX' SCREEN, AND 'MESSAGE' SCREEN (BITMAP INFORMATION) |
| OPERATION KEY INFORMATION | · INFORMATION REPRESENTING WHETHER MULTI-FUNCTION DEVICE IS TOUCH PANEL MODEL OR NON-TOUCH-PANEL MODEL<br>· BITMAP INFORMATION REPRESENTING EACH KEY ASSOCIATED WITH OPERATION OF EACH OF 'ENTER' KEY, 'PREVIOUS' KEY, AND 'NEXT' KEY<br>· INFORMATION REPRESENTING POSITION OF EACH KEY<br>· INFORMATION REPRESENTING POSITION OF TITLE | · INFORMATION REPRESENTING WHETHER MULTI-FUNCTION DEVICE IS TOUCH PANEL MODEL OR NON-TOUCH-PANEL MODEL<br>· INFORMATION REPRESENTING WHICH HARD KEY IS ASSOCIATED WITH OPERATION OF EACH OF 'ENTER' KEY, 'PREVIOUS' KEY, AND 'NEXT' KEY<br>· INFORMATION REPRESENTING WHETHER TO LIGHT UP HARD KEYS CORRESPONDING TO 'ENTER' KEY, 'PREVIOUS' KEY, AND 'NEXT' KEY<br>· INFORMATION REPRESENTING POSITION OF TITLE |

FIG.12B

| | | | |
|---|---|---|---|
| UNIQUE SCREEN TYPE INFORMATION | LIST | · INFORMATION REPRESENTING WHAT IS UNIQUE KEY ('↑(UP)' KEY AND '↓(DOWN)' KEY)<br>· BITMAP INFORMATION REPRESENTING '↑(UP)' KEY AND '↓(DOWN)' KEY<br>· INFORMATION REPRESENTING POSITIONS OF '↑(UP)' KEY AND '↓(DOWN)' KEY | · INFORMATION REPRESENTING WHAT IS UNIQUE KEY ('↑(UP)' KEY '↓(DOWN)' KEY AND ITEM SELECTION KEY)<br>· INFORMATION REPRESENTING POSITIONS OF SELECTION CHOICES<br>· INFORMATION REPRESENTING WHICH HARD KEY IS ASSOCIATED WITH OPERATION OF EACH OF '↑(UP)' KEY, '↓(DOWN)' KEY, AND ITEM SELECTION KEY<br>· INFORMATION REPRESENTING WHETHER TO LIGHT UP HARD KEYS CORRESPONDING TO '↑(UP)' KEY, '↓(DOWN)' KEY, AND ITEM SELECTION KEY |
| | INPUT BOX | · INFORMATION REPRESENTING WHAT IS UNIQUE KEY ('←(LEFT ARROW)' KEY, '→(RIGHT ARROW)' KEY, 'CLEAR' KEY, AND CHARACTER KEYS (FOR EXAMPLE, NUMERICAL KEYS OF 0 TO 9))<br>· BITMAP INFORMATION REPRESENTING '←(LEFT ARROW)' KEY, '→(RIGHT ARROW)' KEY, 'CLEAR' KEY, AND CHARACTER KEYS<br>· INFORMATION REPRESENTING POSITIONS OF '←(LEFT ARROW)' KEY, '→(RIGHT ARROW)' KEY, 'CLEAR' KEY, AND CHARACTER KEYS | · INFORMATION REPRESENTING WHAT IS UNIQUE KEY ('←(LEFT ARROW)' KEY, '→(RIGHT ARROW)' KEY, 'CLEAR' KEY, CHARACTER KEYS (FOR EXAMPLE, NUMERICAL KEYS OF 0 TO 9), AND NUMBER SELECTION KEY<br>· BITMAP INFORMATION REPRESENTING CHARACTER KEYS<br>· INFORMATION REPRESENTING POSITIONS OF CHARACTER KEYS<br>· INFORMATION REPRESENTING WHICH HARD KEY IS ASSOCIATED WITH OPERATION OF EACH OF '←(LEFT ARROW)' KEY, '→(RIGHT ARROW)' KEY, 'CLEAR' KEY, AND NUMBER SELECTION KEY<br>· INFORMATION REPRESENTING WHETHER TO LIGHT UP HARD KEYS CORRESPONDING '←(LEFT ARROW)' KEY, '→(RIGHT ARROW)' KEY, 'CLEAR' KEY, AND NUMBER SELECTION KEY |
| | MESSAGE | — | — |

FIG.13A

```
UNIQUE NUMBER: 003
  INSTRUCTION GENRE: UI INSTRUCTION
UI INSTRUCTION INFORMATION
  SCREEN TYPE: LIST
  TITLE: "PLEASE SELECT SERVICE"
  ENTER KEY: VALID PREVIOUS KEY: INVALID NEXT KEY: INVALID
  UNIQUE LIST INFORMATION :
    LIST: "SERVICE A", "SERVICE B"
    SELECTION METHOD, "SELECTION OF ONE CHOICE"
```

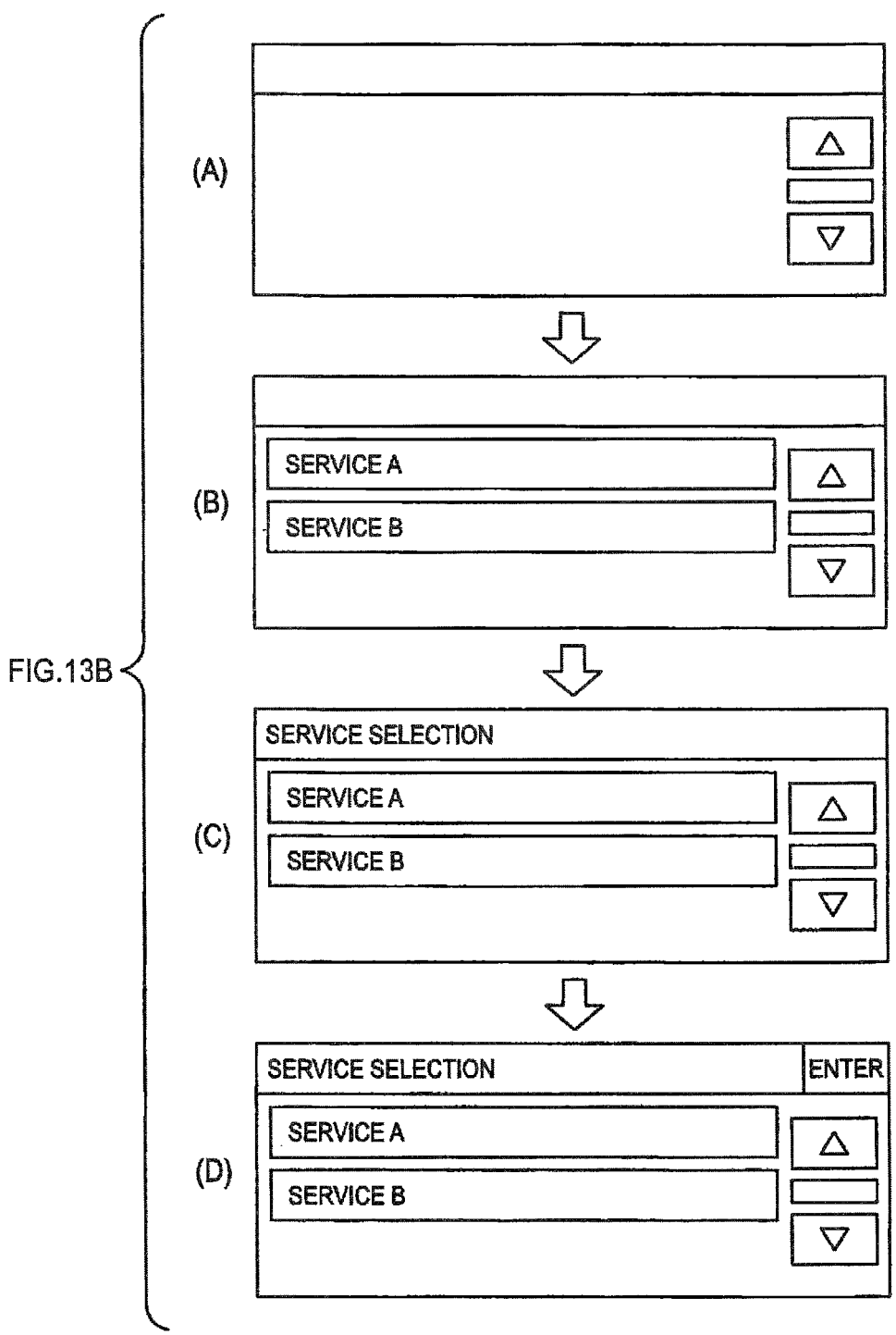

FIG. 15A

| TREE INFORMATION | | |
|---|---|---|
| UNIQUE NUMBER | : PREVIOUS | : NEXT |
| 001 | : STANDBY | : UNDETERMINED 001B |
| 002 | : - | : UNDETERMINED 002B |
| 003 | : - | : UNDETERMINED 003B |
| 004 | : 003 | : 006 |
| 005 | : 003 | : 010 |
| 006 | : UNDETERMINED 006A | : UNDETERMINED 006B |
| 007 | : 006 | : 009 |
| 008 | : - | : 003 |
| 009 | : - | : STANDBY |
| 010 | : 005 | : UNDETERMINED 010B |
| 011 | : - | : STANDBY |
| 012 | : 001 | : UNDETERMINED 012B |
| 013 | : UNDETERMINED 013A | : 014 |
| 014 | : 014 | : 015 |
| 015 | : - | : STANDBY |

FIG. 15B

| UNDETERMINED TABLE | |
|---|---|
| UNIQUE NUMBER | : DETERMINATION |
| 001B | : 001 = EXTERNAL SERVICE → 002<br>001 = DEVICE FUNCTION → 012 |
| 002B | : 002 = YES → 003<br>002 = NO → 001 |
| 003B | : 003 = SERVICE A → 004<br>003 = SERVICE B → 005 |
| 006A | : 003 = SERVICE A → 004<br>003 = SERVICE B → 005 |
| 006B | : CASE WHERE ACQUISITION OF THUMBNAILS AND DATA NAMES IN SERVICE REPRESENTED BY 003 ENDS NORMALLY→ 007<br>CASE WHERE ACQUISITION OF THUMBNAILS AND DATA NAMES IN SERVICE REPRESENTED BY 003 ENDS ERRONEOUSLY→ 008 |
| 010B | : CASE WHERE UPLOAD REQUEST IN SERVICE REPRESENTED BY 003 ENDS NORMALLY→ 011<br>CASE WHERE UPLOAD REQUEST IN SERVICE REPRESENTED BY 003 ENDS ERRONEOUSLY→ 008 |
| 012B | : 012 = COPYING → 013<br>012 = SCANNING → ⋯ |
| 013A | : 001FLAG = ON → 001<br>001FLAG = OFF → STANDBY |

FIG. 16A

```
FIRST MAPPING TABLE
  UNIQUE NUMBER : ITEM
-----------------------------------------------------------------
  001            : EXTERNAL SERVICE/DEVICE FUNCTION, 001 FLAG
  002            : YES/NO
  003            : IDENTIFICATION INFORMATION OF SERVICE
  004            : UPLOAD/DOWNLOAD
  005            : UPLOAD
  006            : STORING-IN-MEDIUM/PRINTING
  007            : DATA NAME OF IMAGE DATA/ CANCEL
  008            : NONE
  009            : NONE
  010            : READING-FROM-MEDIUM/SCANNING
  011            : NONE
  012            : NONE
  013            : COPY RESOLUTION
  014            : YES/NO
  015            : NONE
```

FIG. 16B

```
SECOND MAPPING TABLE
  UNIQUE NUMBER : ITEM
-----------------------------------------------------------------
  001            : NONE
  002            : NONE
  003            : NONE
  004            : NONE
  005            : NONE
  006            : NONE
  007            : LIST OF THUMBNAILS OF IMAGE DATA, LIST OF DATA NAMES
                   OF IMAGE DATA
  008            : IDENTIFICATION INFORMATION OF ERROR
  009            : DATA NAMES OF IMAGE DATA, STORING-IN-MEDIUM/PRINTING
  010            : NONE
  011            : READING-FROM-MEDIUM/SCANNING
  012            : NONE
  013            : NONE
  014            : NONE
  015            : COPY RESOLUTION
```

FIG. 17

| SETTING INFORMATION TABLE | |
|---|---|
| SETTING ITEM | : SETTING INFORMATION |
| EXTERNAL SERVICE/DEVICE FUNCTION | : EXTERNAL SERVICE |
| 001 FLAG | : ON |
| IDENTIFICATION INFORMATION OF SERVICE/ IDENTIFICATION INFORMATION OF FUNCTION | : SERVICE A |
| UPLOAD/DOWNLOAD | : DOWNLOAD |
| STORING-IN-MEDIUM/PRINTING/READING-FROM-MEDIUM/SCANNING | : PRINTING |
| DATA NAME OF IMAGE DATA | : FILES 1 AND 2 |
| COPY RESOLUTION | : 300 dpi |
| YES/NO | : YES |
| IDENTIFICATION INFORMATION OF ERROR | : NO ERROR |
| LIST OF PROCESSES WHICH SERVICE A PROVIDES | : UPLOAD, DOWNLOAD |
| LIST OF PROCESSES WHICH SERVICE B PROVIDES | : UPLOAD |
| LIST OF THUMBNAILS OF IMAGE DATA | : THUMBNAILS 1, 2, 3, 4... |
| LIST OF DATA NAMES OF IMAGE DATA | : FILE NAMES 1, 2, 3, 4... |

FIG.18

```
UNIQUE NUMBER : 003
UI INSTRUCTION INFORMATION
  UNIQUE LIST INFORMATION :
    LIST : "SERVICE A" <FIX>, "SERVICE E", "SERVICE B",
"SERVICE C", "SERVICE D"
```
R2

FIG.19

```
UNIQUE NUMBER : 003
  INSTRUCTION TYPE : UI INSTRUCTION
UI INSTRUCTION INFORMATION
  SCREEN TYPE : LIST
  TITLE : "SELECT SERVICE",
  ENTER KEY : VALID  PREVIOUS KEY : VALID  NEXT KEY : INVALID
  UNIQUE LIST INFORMATION :
    LIST : "SERVICE A", "SERVICE E", "SERVICE B", "SERVICE C",
"SERVICE D"
    SELECTION METHOD : SELECTION OF ONE CHOICE
```
R3

```
UNIQUE NUMBER : 003
  INSTRUCTION TYPE : UI INSTRUCTION
UI INSTRUCTION INFORMATION
  SCREEN TYPE : LIST
  TITLE : "SELECT SERVICE",
  ENTER KEY : VALID  PREVIOUS KEY : VALID  NEXT KEY : INVALID
  UNIQUE LIST INFORMATION :
    LIST : "SERVICE A", "SERVICE F", "SERVICE E", "SERVICE B",
"SERVICE C", "SERVICE D"
    SELECTION METHOD : SELECTION OF ONE CHOICE
```
                                                          R4

# TERMINAL DEVICE, NON-TRANSITORY COMPUTER-READABLE STORAGE MEDIUM STORING COMPUTER PROGRAM FOR TERMINAL DEVICE, AND SYSTEM

CROSS-REFERENCE TO RELATED APPLICATION

This application claims priority to Japanese Patent Application No. 2013-048004, filed on Mar. 11, 2013, the contents of which are hereby incorporated by reference into the present application.

TECHNICAL FIELD

The present specification discloses a terminal device, a program for the terminal device, a system, and a method for controlling the system for making transitions of a screen of a display unit according to instructions from a server.

BACKGROUND

There have been proposed technique for displaying predetermined screens on a display of a terminal device (see, for example, JP-A-H11-212914 and JP-A-2009-207872). JP-A-H11-212914 describes an on-line business processing system which accesses a host computer to perform a business process. In the on-line business processing system, output logical information and output control information are output from an on-line business program installed in the host computer. Then, based on the output information, hypertext combined with a pre-stored hypertext template is transmitted from the host computer to a browser. Based on the hypertext, data is displayed on the browser.

JP-A-2009-207872 describes a medical control system that displays a screen for controlling a medical device on a controller. In the medical control system, the controller receives GUI setting information from the medical device. The GUI setting information is text data, which is GUI screen parameter information, generated for forming each of components of a GUI screen. The controller analyzes the GUI setting information so as to generate component images, combines the component images so as to form the GUI image, and displays the GUI image. Also, there is described that the controller may store template information on a plurality of graphics in advance, and adjust the sizes or positions of the graphics based on the GUI screen parameter information.

SUMMARY

A terminal apparatus may receive, for example, a predetermined service that is provided via a network such as the Internet. Accordingly, processing that cannot be executed by the terminal apparatus is executed by an external service on behalf of the terminal apparatus, whereby functions of the terminal apparatus can be expanded. In this case, the terminal apparatus displays, on a display unit, multiple menu item images for inputting information required for receiving the service and the like as needed. However, the multiple menu item images are displayed in the display order managed by a service providing apparatus, and therefore, user's convenience may be lost.

In one aspect of the teachings disclosed herein, a terminal device may be provided. The terminal device may comprise a communication unit configured to connect with a network, an operation reception unit, a storage unit, a display unit, and a control device. The control device may be configured to perform receiving, via the communication unit, server-side display order information transmitted from a server which is connected with the network. The server-side display order information may indicate a server-side display order, designated on a server side, of a plurality of object images included in a display screen displayed on the display unit. The display unit may be configured to display various kinds of images. The control device may be configured to perform storing terminal device-side display order information in the storage unit when a predetermined operation is received via the operation reception unit. The terminal device-side display order information may indicate a terminal device-side display order which is an order different from the server-side display order. The control device may be configured to perform displaying, in the display screen, the plurality of object images in accordance with the server-side display order when the storage unit is not storing the terminal device-side display order information. The control device may be configured to perform displaying, in the display screen, the plurality of object images in accordance with the terminal-side display order when the storage unit is storing the terminal device-side display order information.

BRIEF DESCRIPTION OF DRAWINGS

FIGS. 9A to 9O are diagrams illustrating description contents of various types of individual definition information, wherein:

FIG. 9A is a diagram illustrating description contents of individual definition information for displaying a screen to enable the user to select whether to use an external server or a function of the device;

FIG. 9B is a diagram illustrating description contents of individual definition information for displaying a screen to enable the user to select whether it is allowed to use the external service;

FIG. 9C is a diagram illustrating description contents of individual definition information for displaying a screen to enable the user to select a desired service from a service A and a service B which are external services;

FIG. 9D is a diagram illustrating description contents of individual definition information for displaying a screen to enable the user to select whether to use an upload service or a download service;

FIG. 9E is a diagram illustrating description contents of individual definition information for displaying a screen to enable the user to confirm that the user uses the upload service;

FIG. 9F is a diagram illustrating description contents of individual definition information for displaying a screen to enable the user to select whether to store image data in a medium or print the image data.

FIG. 9G is a diagram illustrating description contents of individual definition information for displaying a screen to enable the user to select desired image data from a plurality of image data;

FIG. 9H is a diagram illustrating description contents of individual definition information for displaying a screen to enable the user to confirm that an error has occurred in communication with a server for an external service;

FIG. 9I is a diagram illustrating description contents of individual definition information for executing download of image data;

FIG. 9J is a diagram illustrating description contents of individual definition information for displaying a screen to enable the user to select whether to read a medium or perform scanning;

FIG. 9K is a diagram illustrating description contents of individual definition information for executing upload of image data;

FIG. 9L is a diagram illustrating description contents of individual definition information for displaying a screen to enable the user to select whether to perform copying or scanning;

FIG. 9M is a diagram illustrating description contents of individual definition information for displaying a screen to enable the user to input a copy resolution;

FIG. 9N is a diagram illustrating description contents of individual definition information for displaying a screen to enable the user to select whether to start copying; and FIG. 9O is a diagram illustrating description contents of individual definition information for performing copying;

FIGS. 10A to 10D are diagrams illustrating a plurality of types of screens displayed on a display unit having a touch panel function, wherein:

FIG. 10A is a diagram illustrating a screen, which is a list screen including a text list, generated according to the individual definition information shown in FIG. 9C;

FIG. 10B is a diagram illustrating a screen, which is a list screen including an image list, generated according to the individual definition information shown in FIG. 9G;

FIG. 10C is a diagram illustrating a screen, which is a message screen, generated according to the individual definition information shown in FIG. 9H; and FIG. 10D is a diagram illustrating a screen, which is a input box screen, generated according to the individual definition information shown in FIG. 9M;

FIG. 12 (FIGS. 12A and 12B) is a diagram illustrating an example of template information of a case that the display unit of the multi-function device has a touch panel function, and an example of template information of a case that the display unit of the multi-function device does not have a touch panel function;

FIG. 13A is a diagram illustrating an example of list in which image information is generated in the image information generating process of FIG. 5;

FIG. 13B is a diagram illustrating a process in which image information is generated in the image information generating process of FIG. 5;

FIGS. 15A and 15B are diagrams illustrating tree information and an undetermined table, respectively;

FIGS. 16A and 16B are diagrams illustrating a first mapping table and a second mapping table, respectively;

FIG. 17 is a diagram illustrating a setting information table;

FIG. 18 is an example of multi-function device-side display order information;

FIG. 19 is an example of a list showing server-side display order;

EMBODIMENT

A system 1 according to an illustrative embodiment of the present invention will be described with reference to the accompanying drawings. The present invention is not limited by a configuration described below, but can have various configurations without departing from the scope of the present invention. For example, a portion of the following configuration may be omitted or substituted with another configuration. Also, a portion of the following configuration may include another configuration.

<Entire Configuration of System>

Figure 1:
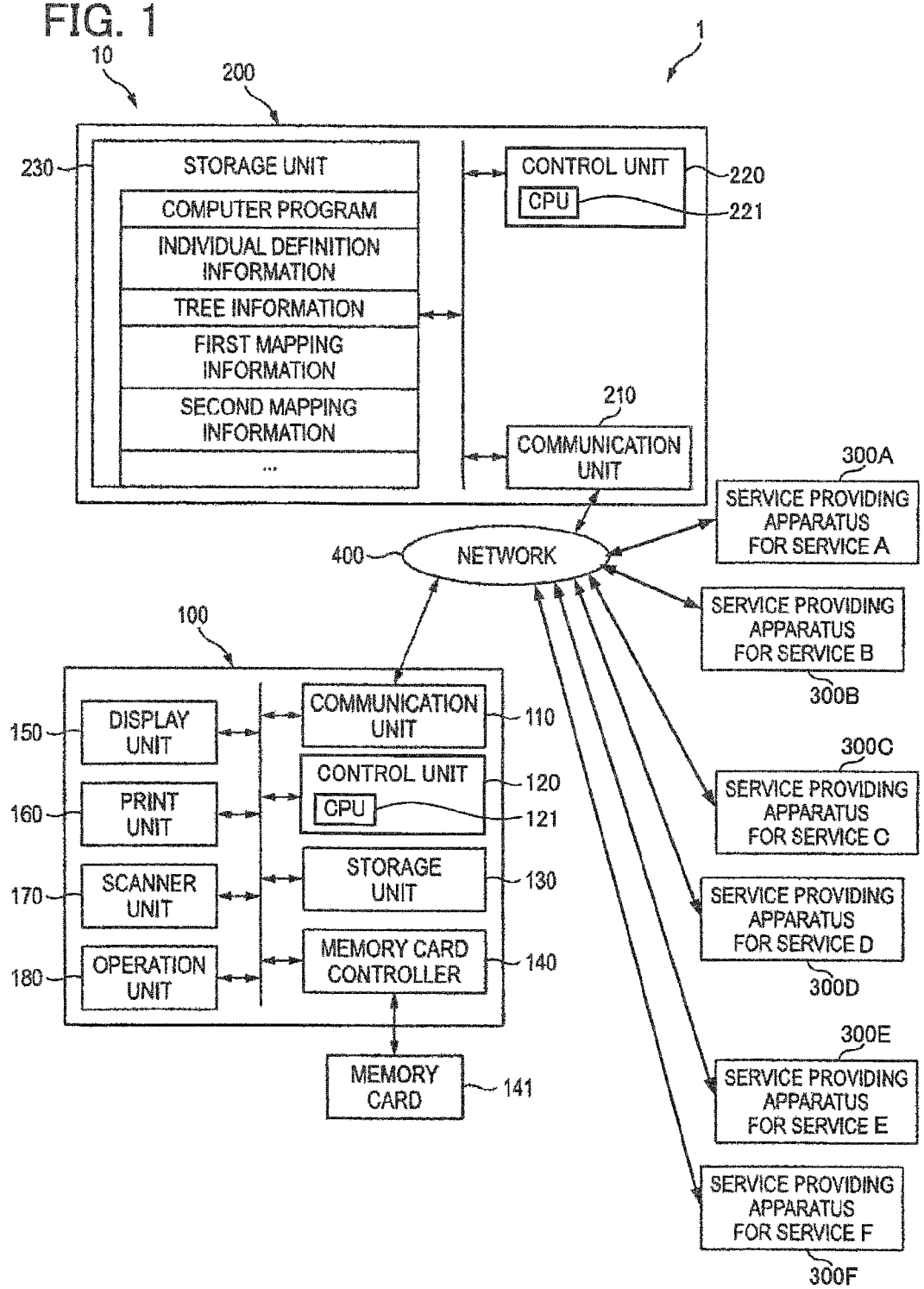
FIG. 1 is a diagram illustrating an example of an entire configuration of a system according to an illustrative embodiment of the present invention, and specifically, a block diagram illustrating an example of a hardware configuration of a multi-function device and a relay server included in a screen control system configuring a part of the system according to the illustrative embodiment.

An entire configuration of the system 1 including a screen control system 10 will be described with reference to FIG. 1. The system 1 is, for example, a service cooperation system. The system 1 includes the screen control system 10, and service providing servers 300A to 300F (collectively referred to as a service providing server 300). The screen control system 10 includes a multi-function device 100 and a relay server 200. In the system 1, the multi-function device 100, the relay server 200, and the service providing servers 300A to 300F are connected to one another through a network 400 to be capable of data communication. FIG. 1 shows a single multi-function device 100; however, a plurality of multi-function devices 100 may exist. Examples of the network 400 include an Internet network. The data communication is performed based on, for example, HTTP/1.1.

In the system 1, it is possible to upload and download electric files in electric-file storing services provided by service providers. Examples of other services provided by the system 1 include a document generating/editing service. According to the document generating/editing service, a user can perform at least one process of generating and editing of a document and share the document, that is electric file, with other users. The services such as an electronic-file storing service are provided by the service providing server 300 provided on the Internet by each service provider. The service providing server 300 is a known web server. The service providing server 300 performs HTTP-based communication with terminals connected to the network 400 such as the Internet so as to provide predetermined services to the terminals. In the following description, the above-mentioned services such as the electronic-file storing service are referred to as services A to F. The services A to F are provided by the service providing servers 300A to 300F, respectively.

The multi-function device 100 is specifically a small-sized digital combined machine. The multi-function device has, for example, a printing function, a scanner function, a copying function, and a fax function. The multi-function device 100 can upload, for example, electronic files of images read by the scanner function, to a service providing server for an electronic-file storing service. Also, the multi-function device 100 can download electronic files from the service providing server for the electronic-file storing service, and prints the downloaded electric files by the printing function of the multi-function device 100. The multi-function device 100 receives the electric-file storing service in cooperation with the relay server 200. At this time, screens displayed on a display unit 150 of the multi-function device 100 are managed by the relay server 200, and transition according to instructions from the relay server 200. The relay server 200 may be a device having a known server function. The relay server 200 may be a server owned by the manufacturer of the multi-function device 100. Alternatively, the relay server 200 may be an existing rental server or virtual server.

Here, a definition of the words "data" and "information" will be explained. In the present specification, "information" is used as a concept superordinate to "data". Consequently, "A data" may be rephrased as "A information". Further, "B data", which is duplicated or converted from "A data", is "A information" as long as it is used having a meaning equal to the "A data".

<Hardware Configuration of Multi-Function Device and Relay Server>

A hardware configuration of the multi-function device 100 and the relay server 200 included in the screen control system 10 will be described with reference to FIG. 1. The multi-function device 100 includes a communication unit 110, a control unit 120, a storage unit 130, a memory card controller 140, a display unit 150, a print unit 160, a scanner unit 170, and an operation unit 180. The communication unit 110 performs communication with other apparatuses connected to the network 400 and mobile terminal apparatuses not shown. The communication unit 110 may comprise a cable communication unit and wireless communication unit. As the cable communication unit, a known network card can be used. As the wireless communication unit, a wireless LAN interface for executing a wireless communication with the mobile terminal apparatuses can be used. The control unit 120 includes a central processing unit (referred to as CPU) 121, and a ROM and a RAM electrically connected to the CPU 121, and configures a computer. The CPU 121 controls the operation of the multi-function device 100 according to computer programs stored in the ROM. The computer programs stored in the ROM include computer programs for each of processes shown in FIGS. 2 to 8. Further, the computer programs stored in the ROM include a rendering driver for generating screens based on texts written in a markup language such as XML. The RAM temporally stores various types of data.

The storage unit 130 may be a known non-volatile storage device such as a NAND-type flash memory. The storage unit 130 stores various types of data such as template information which is shown in FIGS. 12A and 12B and will be described below. The storage unit 130 also stores fixed object identification information, user registration number priority flag, user setting priority flag, history priority flag, and newly available item priority flag. The fixed object identification information is information for identifying an object image which is displayed as fixed object image priority display. The object image which is displayed as fixed object image priority display is an image of which display order is fixed and is not changed even when various kinds of process are performed to rearrange the display order. The fixed object identification information may be, for example, a character string displayed in an object image displayed in a fixed manner. The fixed object identification information may be stored by, for example, a manufacturer of the multi-function device 100 into the storage unit 130 in a stage before the shipment of the multi-function device 100. The contents of the user registration number priority flag, the user setting priority flag, the history priority flag, and the newly available item priority flag will be explained later.

The storage unit 130 also stores multi-function device-side display order information, history ON unique number, history content information, user registration number information. The multi-function device-side display order information is information with which the multi-function device 100 designates the order in which object images are displayed as a list on the display unit 150. The multi-function device-side display order information can also store a fixed display attribute for each of the object images. The object image having the fixed display attribute thereto is an image which is displayed as fixed object image priority display explained later. The server-side display order information is information for storing object image identification information, which is for identifying an object image, in accordance with the display order in which the images are displayed on the display unit 150. The history ON unique number is a unique number for identifying individual definition information corresponding to a screen on which history priority display explained later is performed. The history content information is information indicating how many times any given object image is selected in a screen on which history priority display is performed. The history content information may be stored in association with each of the history ON unique numbers. The user registration number information is information for storing the number of users who are registered as users for each of a service A to service F. The user registration is process for storing information about service users (for example, user name, password) for using each service.

The memory card controller 140 performs control of storage of a memory card 141 inserted into the multi-function device 100. Specifically, the memory card controller 140 performs writing of data in a memory card 141, erasing of data stored in the memory card 141, reading of data stored in the memory card 141, or the like, based on an instruction of the control unit 120. In the memory card 141, electronic files having predetermined formats are stored. The display unit 150 has a display device such as an LCD. The display unit 150 displays various screens to be described below. The display unit 150 may be a model have a touch panel function (hereinafter, referred to as a touch panel model). The display unit 150 may have a plurality of display devices. The print unit 160 prints images according to an instruction of the control unit 120. The scanner unit 170 reads images recorded on sheets set by the user. The scanner unit 170 reads images according to an instruction of the control unit 120. The operation unit 180 includes a plurality of operation buttons operable by the user, and transmits a signal according to operations, such as pushing, of the user to the control unit 120. The operation unit 180 may have a touch panel function. The user can input a desired instruction by operating the operation unit 180.

In a case of the touch panel model, the user can input a desired instruction by operating the display unit 150. For example, keys (such as a 'ENTER' key (which is a key for a transition instruction) and an 'UP' key (which is not a key for a transition instruction)) shown in FIGS. 10A to 10D are not included in the operation unit 180, and are implemented by the touch panel function of the display unit 150. The operation unit 180 includes an item selection key and number selection keys to be described below.

If the multi-function device 100 has no touch panel function in the display unit 150 (hereinafter, referred to as a non-touch-panel model), the keys (such as the 'ENTER' key (which is a key for a transition instruction) and the 'UP' key (which is not a key for a transition instruction)) shown in FIGS. 10A to 10D are assigned as hard keys of the operation unit 180. Even in the case of the non-touch-panel model, the operation unit 180 includes the item selection key and the number selection keys to be described below.

The relay server 200 includes a communication unit 210, a control unit 220, and a storage unit 230. The communication unit 210 performs communication with other apparatuses connected to the network 400. As the communication unit 210, a known network card can be used. The control unit 220 includes a CPU 221, and a ROM and a RAM electrically connected to the CPU 221, and configures a computer. The CPU 221 controls the operation of the relay server 200 according to computer programs stored in the ROM and the storage unit 230. The RAM temporally stores various types of data. The storage unit 230 may be a known non-volatile storage device such as a hard disk drive. The storage unit 230 stores computer programs. The stored computer programs include, for example, a computer program for a process shown in FIG. 14. Further, the stored computer programs include a computer program for performing communication with the service providing server 300 to provide the services to the multi-function device 100. The relay server 200 will be described as a physically existing server; however, the relay server 200 may be a virtual machine which functions as a server in cooperation with a plurality of physical apparatuses.

The storage unit 230 stores individual definition information shown in FIGS. 9A to 9O, tree information and an undetermined table shown in FIGS. 15A and 15B, a first mapping table and a second mapping table shown in FIGS. 16A and 16B, and a setting information table shown in FIG. 17. The setting information table (to be described below in detail) includes determined information which has been determined by an operation of the user on the 'ENTER' key in the multi-function device 100, and setting information which is not determined information. Examples of the setting information which is not determined information in the setting information table shown in FIG. 17 include a 001 flag which is turned on or off by an internal process of the relay server 200, a list of processes which the service A provides and a list of processes which the service B provides, error identification information which is updated by communication between the relay server 200 and the service providing server 300, a list of thumbnails of image data, and a list of data names of the image data. The lists of processes are set in advance by a manager of the relay server 200.

<Display Setting Processing Executed by Multi-Function Device>

Figure 2:
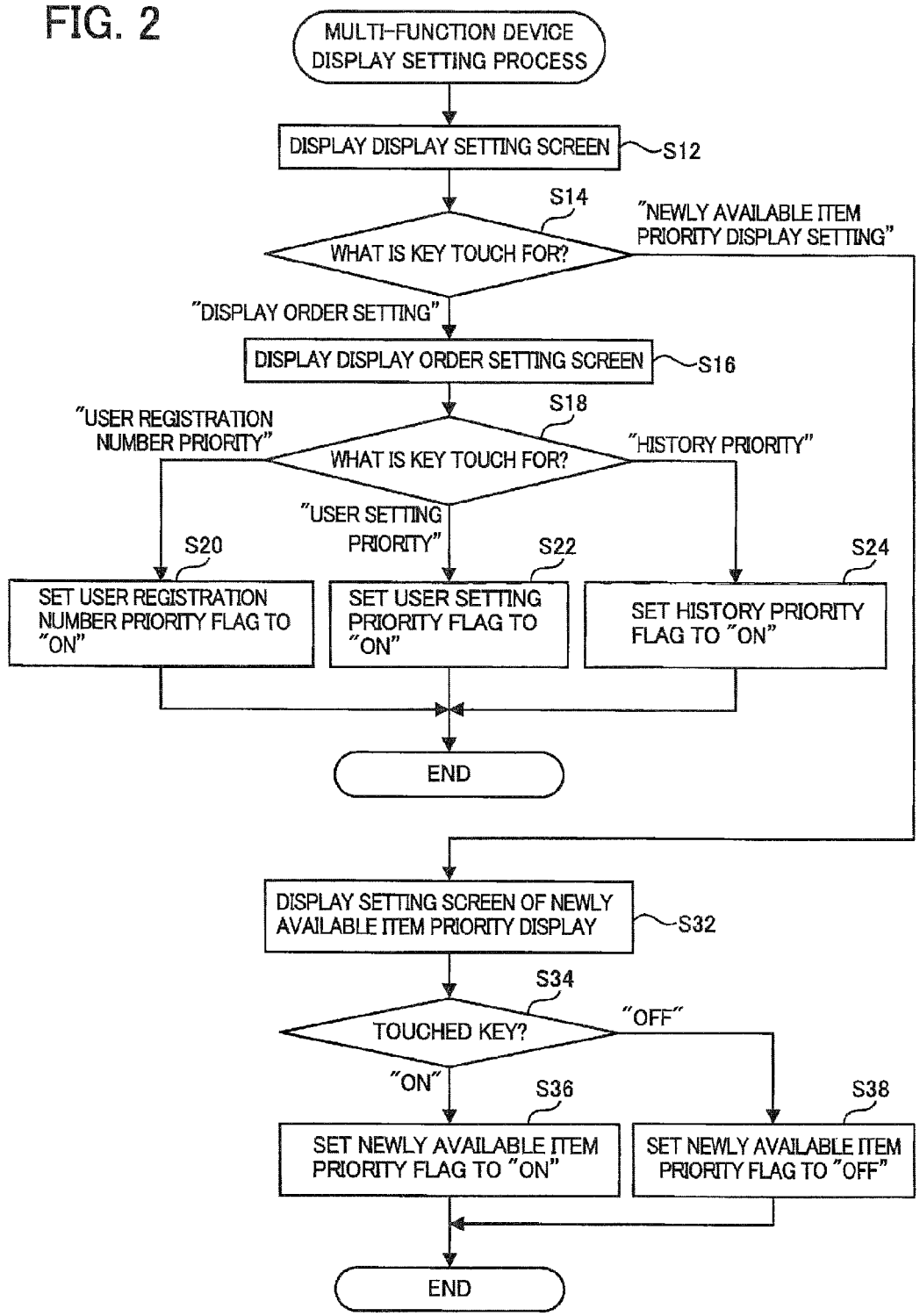
FIG. 2 is a flowchart illustrating display setting processing executed by the multi-function device.

The display setting processing executed by the multi-function device 100 will be explained with reference to FIG. 2. When a start command of the display setting processing is input into the multi-function device 100, the flow of FIG. 2 is started. For example, when the user touches the display setting icon displayed on the display unit 150, the start command of the display setting processing may be input.

In S12, the control unit 120 displays the display setting screen on the display unit 150. The display setting screen is a screen for making various kinds of settings when the object image is displayed on the display screen. In S14, the control unit 120 determines the content of the key that has been touched. When the key that has been touched is the "display order setting key" (S14: display order setting), the control unit 120 displays the display order setting screen on the display unit 150 (S16). The user registration number priority key, the user setting priority key, the history priority key, and the like are displayed on the display order setting screen.

In S18, the control unit 120 determines the content of the key that has been touched. When the key that has been touched is the "user registration number priority key" (S18: user registration number priority), the control unit 120 sets the user registration number priority flag to "ON" (S20). The user registration number priority flag is information for setting whether the user registration number priority display is performed or not. The user registration number priority display is process for preferentially displaying object images having more user registration numbers on the display unit 150.

When the key that has been touched is "user setting priority key" (S18: user setting priority), the control unit 120 sets the user setting priority flag to "ON" (S22). The user setting priority flag is information for setting whether the user setting priority display is performed or not. The user setting priority display is process for displaying object images in a display order that is set by the user.

When the key that has been touched is the "history priority key" (S18: history priority), the control unit 120 sets the history priority flag to "ON" (S24). The history priority flag is information for setting whether the history priority display is performed or not. The history priority display is process for displaying object images on the display unit 150 in such a manner that those of multiple object images which are selected by the user more number of times are displayed preferentially.

On the other hand, when, in S14, the key that has been touched is the "newly available item priority display setting key" (S14: newly available item priority display setting), the control unit 120 displays the setting screen of the newly available item priority display on the display unit 150 (S32). The setting screen of the newly available item priority display is a screen for receiving setting input for determining whether the newly available item priority display is performed or not. The newly available item priority display is process for preferentially displaying a new object image on the display unit 150. The new object image is an object image that does not exist in the multi-function device-side display order information stored in the storage unit 130 but exists in a list included in the individual definition information received from that relay server 200. More specifically, the new object image is an object image of a newly available item that was not included in the individual definition information in the previous transmission but is included in the individual definition information in the current transmission.

In S34, the control unit 120 determines the content of the key that has been touched. When the key that has been touched is a key for turning ON the newly available item priority display (S34: ON), the control unit 120 sets the newly available item priority flag to "ON" (S36). On the other hand, when the key that has been touched is a key for turning OFF the newly available item priority display (S34: OFF), the control unit 120 sets the newly available item priority flag to "OFF" (S38). Then, the flow is terminated.

<Main Process Executed by Multi-Function Device>

A main process executed by the multi-function device 100 will be described with reference to FIGS. 3 and 4. In order to start the main process, the user inputs process start to the multi-function device 100. Specifically, if the multi-function device 100 is a touch panel model, a plurality of application start icons are displayed on the display unit 150 of the multi-function device 100 which is in a standby state. The user touches any one application start icon of the plurality of application start icons. The application start icons include an application start icon for instructing start of a remote UI from a top screen, and an application start icon for instructing start of the remote UI from a screen regarding any one of the functions (such as copying and scanning) of the multi-function device 100. When the user touches the application start icon for instructing start of the remote UI from the top screen, the control unit 120 transmits application start request information which does not include information specifying a device function to the relay server 200. When the user touches the application start icon for instructing start of the remote UI from a screen regarding any one function, the control unit 120 transmits application start request information which includes information specifying a device function to the relay server 200. The top screen is a screen which is displayed on the display unit 150 according to individual definition information having a unique number 001 (see FIG. 9A) to enable the user to select whether to use an external service or a function of the multi-function device 100. When the user selects to use an external service, a remote UI for using the external service is implemented, and when the user selects to use a function of the multi-function device 100, a remote UI for using the function of the multi-function device 100 is implemented.

Meanwhile, in a case of the non-touch panel model, in order to start the main process, the user pushes an operation button of the operation unit 180 associated with the start of the main process. When starting the main process, in step S100, the control unit 120 controls the communication unit 110 to transmit application start request information without any information specifying a device function, to the relay server 200. Then, the control unit 120 stands by until individual definition information, which the relay server 200 transmits in response to the transmitted application start request information, is received (No in step S102). The control unit 120 controls the communication unit 110 to receive the individual definition information. If receiving the individual definition information (Yes in step S102), the control unit 120 makes determination on an instruction type of the received individual definition information in step S104. The received individual definition information is stored in the RAM included in the control unit 120 or the like.

The individual definition information includes various types of information as shown in FIG. 9. Specifically, as shown in FIGS. 9A to 9O, each of the individual definition information includes a unique number and an instruction type. The unique number has a function as a unique identifier for identifying the individual definition information. Individual definition information shown in FIGS. 9A to 9H, 9J, and 9L to 9N is individual definition information in which the instruction type represents a UI instruction, and which includes UI instruction information. The UI instruction information includes a screen type which is a determined information input type, a title, information representing whether each transition instruction by a 'ENTER' key, a 'PREVIOUS' key, and a 'NEXT' key is valid or invalid, and unique information. Operation of any one key of the 'ENTER' key, the 'PREVIOUS' key, and the 'NEXT' key becomes operations for making a transition, which may alternately be referred to as "change", of a screen displayed on the display unit 150.

Unique list information shown in FIGS. 9A to 9D, 9F to 9G, 9J, 9L, and 9N is unique information included in UI instruction information in which the screen type is a list type. The unique list information includes a list of selection options and a selecting method. The list functions as server-side display order information. Contents of the server-side display order information will be described later.

Unique message information shown in FIGS. 9E and 9H is unique information included in UI instruction information in which the screen type is a message type. Unique input box information shown in FIG. 9M is unique information included in UI instruction information in which the screen type is an input box type. The unique input box information includes an initial value for an input box, characters capable of being input, the maximum number of characters, and the minimum number of characters. Individual definition information shown in FIGS. 9I, 9K, and 9O is individual definition information in which the instruction type represents a function operation instruction, and includes function operation instruction information. The function operation instruction information includes an operation type. The individual definition information in which the instruction type represents the function operation instruction includes parameters for executing a designated function as described below. The multi-function device 100 performs functions such as the printing function, the scanner function, and the copying function according to those parameters. The above-mentioned information included in the individual definition information will be described below.

When the instruction type included in the individual definition information stored in the RAM represents the function operation instruction (function operation instruction in step S104), in step S106, the control unit 120 controls at least one of the print unit 160, the scanner unit 170, the memory card controller 140, and the communication unit 110 such that a function corresponding to the operation type included in the function operation instruction information is performed based on the parameters. For example, the individual definition information shown in FIG. 9I includes the operation type representing download. In this case, according to the parameters of the instruction and the data name described in the individual definition information, the control unit 120 controls the communication unit 110 to download image data stored in the service providing server 300. When the individual definition information includes a parameter representing printing of downloaded image data, according to the parameters of the instruction and the printing described in the individual definition information, the control unit 120 controls the print unit 160 to print the image data. After executing step S106, the control unit 120 controls the communication unit 110 to transmit the function operation end information, representing that the function operation instructed in the individual definition information stored in the RAM has ended, to the relay server 200 (S108). On the occasion of the transmission of the function operation end information, the control unit 120 incorporates a unique number matching the unique number of the individual definition information stored in the RAM, in the function operation end information. Then, the control unit 120 returns to the process of step S102. At this time, the control unit 120 erases the individual definition information stored in the RAM.

Meanwhile, when the instruction type included in the individual definition information stored in the RAM represents the UI instruction (UI instruction in step S104), in step S110, the control unit 120 executes a screen information generating process. In the screen information generating process, the individual definition information stored in the RAM is referred to. The screen information generating process executed in step S110 will be described below. After executing the screen information generating process of step S110, in step S112, the control unit 120 displays a screen on the display unit 150 according to the screen information generated in step S110. In the multi-function device 100 which is a non-touch-panel model and is capable of lighting up hard keys configuring the operation unit 180, a backlight of a hard key instructed to be lit up is lit up according to the screen information. A hard key validated for instruction operation can be lit up to be visualized and thus it is possible to improve operability for the user.

Figure 10A:
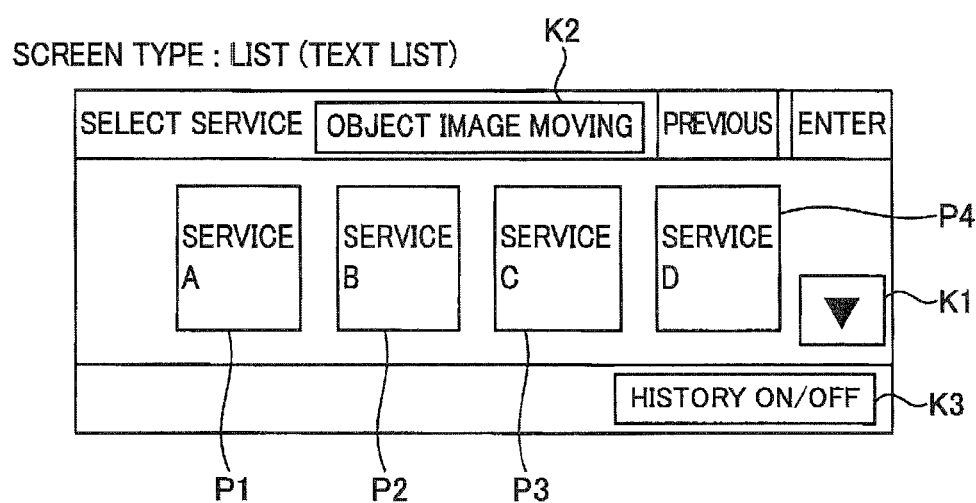

The screen displayed on the display unit 150 in step S112 will be described with reference to FIGS. 10A to 10D. A case that the multi-function device 100 is a touch panel model is exemplified. When the individual definition information stored in the RAM is the individual definition information shown in FIG. 9C, a screen shown in FIG. 10A is displayed on the display unit 150. This screen is a list type screen based on the individual definition information in which the screen type represents a list type. The screen shown in FIG. 10A includes 'SELECT SERVICE' described as a title in the individual definition information and a 'ENTER' key (marked with 'ENTER' and 'PREVIOUS' in FIG. 10A) corresponding to descriptions of 'ENTER KEY: VALID' and 'PREVIOUS KEY: VALID'. Since it is described that the 'NEXT' key is invalid, the 'NEXT' key (marked with 'NEXT' in FIG. 10) are not included in the screen shown in FIG. 10A. The 'PREVIOUS' key may be included in the screen shown in FIG. 10A so as to be incapable of being operated. (In other words, the 'PREVIOUS' key may not be operable.) In this case, the 'PREVIOUS' key may be grayed out.

A list included in the individual definition information as shown in FIG. 9C (see region R0) functions as the server-side display order information. The server-side display order information is information with which the relay server 200 designates the order in which object images, i.e., selection options, are displayed as a list on the display unit 150. The server-side display order information is information for storing the object image identification information according to the display order according to which the object images are displayed on the display unit 150. The object images are images which are displayed as the selection options on the display unit 150. When an object image is touched, operation corresponding to the touched object image is performed.

The list included in the individual definition information as shown in FIG. 9C includes the object image identification information. The object image identification information is information indicating each of the object images of "service A" to "service F". In this example of explanation of the present illustrative embodiment, a character string displayed on an object image is used as the object image identification information. The display order of the object image of "service A" is the first. The display order of the object image of "service F" is the sixth. Then, in the screen as illustrated in FIG. 10A, object images P1 to P4 are displayed on the basis of this list. The object images P1 to P4 are associated with "service A" to "service D", respectively. The display order of the object image P1 is the first. The display order of the object image P4 is the fourth. The images corresponding to "service E" and "service F" can be displayed on the display unit 150 when the display screen is switched by touching a down key K1 as explained later.

Further, the screen as shown in FIG. 10A includes a down key K1, an object image moving key K2, and a history ON/OFF switch key K3, which serve as unique keys when the screen type is a "list" format. When the number of object images is more than the number of displays that can be displayed at a time on the display screen, an object image of a lower side in the display order may be configured to be displayed in response to operation of the down key, and an object image of a higher side in the display order may be configured to be displayed in response to operation of the up key. The object image moving key K2 is a key for receiving an execution command input of object image rearranging process explained later. The history ON/OFF switch key K3 is a key for receiving input of setting as to whether the history priority display explained later is performed or not. The user manipulates (presses or touches) the up key and the down key, and, touches an object image in which a service name is displayed, thus selecting a desired service. The number of services that can be selected corresponds to "SELECTION OF ONE CHOICE" described as the selection method of the individual definition information, and is one. For example, when the object image P1 in which the "service A" is displayed is touched, the service A provided by the service providing server 300 A is selected.

When the individual definition information stored in the RAM is the individual definition information shown in FIG. 9G, the screen shown in FIG. 10B is displayed on the display unit 150. This screen is a list type screen based on the individual definition information in which the screen type represents the list type. The screen shown in FIG. 10B includes 'PLEASE SELECT SERVICE' described as the title in the individual definition information, and a 'ENTER' key based on a description that the 'ENTER' key is valid. The screen shown in FIG. 10B includes thumbnails of image data as selection choices. The user selects desired image data by touching a thumbnail. If the 'DOWN' key is operated, thumbnails of the next four image data items are displayed, and if the 'UP' key is operated, thumbnails of the previous four image data items are displayed. A plurality of image data items can be selectable in correspondence with 'selection of a plurality of choices' described as the selection method in the individual definition information.

Information described in parentheses in the individual definition information shown in FIG. 9G or the like is updated by a communication result between the multi-function device 100 and the service providing server 300, or an input of the user received by the multi-function device 100. Specifically, contents of 'LIST' and 'IMAGE LIST' described in the parentheses in the unique list information shown in FIG. 9G are updated by the communication result between the multi-function device 100 and the relay server 200. That is, when the control unit 120 performs processing according to the individual definition information, the unique list information has the updated latest value. In unique message information of FIG. 9H, contents of 'MESSAGE' described in parentheses are updated by the communication result between the multi-function device 100 and the relay server 200. That is, when the control unit 120 performs processing according to the individual definition information, the unique message information has the updated latest value. In the function operation instruction information of FIG. 9I, contents of 'PARAMETER' described in parentheses are updated by an input of the user received by the multi-function device 100. Specifically, 'DATA NAME OF IMAGE DATA' is updated by input operation of the user to select image data in the screen (FIG. 10B) generated according to the individual definition information shown in FIG. 9G 'STORING-IN-MEDIUM/PRINTING' is updated by input operation of the user to store image data in a medium or print the image data in a screen (not shown) generated according to the individual definition information shown in FIG. 9F. That is, when the control unit 120 performs processing according to the individual definition information, the function operation instruction information has the updated latest value. With respect to the contents of 'PARAMETER' described in parentheses in the function operation instruction information of FIGS. 9K and 9O, similarly, when the control unit 120 performs processing according to the individual definition information, the function operation instruction information has the updated latest value.

When the individual definition information stored in the RAM is the individual definition information shown in FIG. 9H, a screen shown in FIG. 10C is displayed on the display unit 150. This screen is a message type screen based on the individual definition information in which the screen type represents a message type. The screen shown in FIG. 10C includes 'SERVER ERROR' described as the title in the individual definition information, and the 'NEXT' key based on a description in which the 'NEXT' key is valid. Since it is described that the 'ENTER' key and the 'PREVIOUS' key are invalid, the 'ENTER' key and the 'NEXT' key are not included in the screen shown in FIG. 10C. Similarly to the above, the 'ENTER' key and the 'PREVIOUS' key may be displayed in a state (including a state in which the 'ENTER' key and the 'PREVIOUS' key have been grayed out) in which the 'ENTER' key and the 'PREVIOUS' key are incapable of being operated. (In other words, the 'ENTER' key and the 'PREVIOUS' key may not be operable). Further, in the screen shown in FIG. 10C, any key unique to the screen type is not included. The screen shown in FIG. 10C includes 'COMMUNICATION WITH SERVER HAS FAILED' as a message corresponding to the message 'PLEASE SELECT IMAGE DATA' shown in FIG. 10B. If the user has confirmed the message, the user pushes the 'NEXT' key.

When the individual definition information stored in the RAM is the individual definition information shown in FIG. 9M, a screen shown in FIG. 10D is displayed on the display unit 150. This screen is an input box type screen based on the individual definition information in which the screen type represents an input box type. The screen shown in FIG. 10D includes 'COPY RESOLUTION' described as the title of the individual definition information, the 'ENTER' key based on a description in which the 'ENTER' key is valid, the 'PREVIOUS' key based on a description in which the 'PREVIOUS' key is valid, and the 'NEXT' key based on a description in which the 'NEXT' key is valid. The screen shown in FIG. 10D includes a left arrow key and a right arrow key (see two keys shown in FIG. 10D by a left arrow and a right arrow), a 'CLEAR' key (marked with 'CLEAR' in FIG. 10D) for erasing a numerical value input in the input box, and numerical keys of 0 to 9 (marked with '0' to '9' in FIG. 10D), as keys unique to a case that the screen type represents the 'input box' type. The numerical keys of 0 to 9 correspond to information representing that characters capable being input are numerical values, and only numerical values can be input into the input box. In the input box of the screen of FIG. 10D, '200' described as the initial value for the input box is displayed as an initial value of the copy resolution. In a case of changing the copy resolution from the initial value of 200 dpi to, for example, 300 dpi, the user operates the left arrow key or the right arrow key so as to move a cursor for inputting a numerical value to the position of '2', operates the 'CLEAR' key so as to erase '2', and operates the numerical key of '3'. In this manner, the user inputs the desired resolution of 300 dpi. The input resolution is a 3-digit numerical value corresponding to information representing that the maximum number of characters is 3 and the minimum number of characters is 3.

If the multi-function device 100 is a non-touch-panel model, each of the 'ENTER' key, the 'PREVIOUS' key, and the 'NEXT' key is assigned to a predetermined hard key of the operation unit 180, and is validated such that predetermined instruction operation is enabled. In the non-touch-panel model, in a list type screen, the item selection key for selecting a predetermined service item is individually provided. The user operates the 'UP' key and the 'DOWN' key so as to move a button to a position representing a desired service, and operates the item selection key. The desired service is selected by the operation of the item selection key. Similarly, in an input box type screen, number selection keys for selecting the numbers 0 to 9 displayed in the screen are individually provided. In a case of changing 200 dpi, displayed as the initial value, to 300 dpi, the user performs the following operation. The user operates a hard key corresponding to the 'CLEAR' key. In this manner, the entire '200' in the input box is erased. Next, the user operates a hard key corresponding to the left arrow key or the right arrow key so as to move the button to the position of '3' included in the displayed screen, and operates the number selection key one time. '3' is input to the input box by the operation of the number selection key. Subsequently, the user moves the button to the position of '0', and operates the number selection key two times in order. Two '0's can be input to the input box by the two times of operation of the number selection key, such that the displayed value becomes '300'. In the case of the non-touch-panel model, a key (for example, the 'UP' key, the 'DOWN' key, the left arrow key, and the right arrow key) of which operation is assigned to a hard key may not be included in the screen.

After executing step S112, in step S114, the control unit 120 determines whether any key has been operated in each screen display. The control unit 120 stands by until any key is operated (No in step S114). When any key has been operated (Yes in step S114), in step S116, the control unit 120 determines whether the operated key is a key unique to the screen type. Here, the key unique to the screen type is a key other than keys that are described as valid or invalid in the individual definition information. Specifically, examples of the key unique to the screen type include the 'DOWN' key K1, the object image moving key K2 and the history ON/OFF switch key K3 shown in FIG. 10A, and the left arrow key, the right arrow key, the 'CLEAR' key, and numerical keys of 0 to 9 shown in FIG. 10D.

When the operated key is not a key unique to the screen type, in order words, when the operated key is any one of the 'ENTER' key, the 'PREVIOUS' key, and the 'NEXT' key (No in step S116), in step S120, the control unit 120 determines whether it is described in the individual definition information stored in the RAM that the operated key is valid. When it is not described that the operated key is valid (No in step S120), the control unit 120 returns to the process of step S114. When it is described that the operated key is valid (Yes in step S120), in step S122, the control unit 120 executes the operation result information generating process. The operation result information generating process executed in step S122 will be described below. Subsequently, the control unit 120 controls the communication unit 110, in step S124, to transmit the generated operation result information to the relay server 200, and returns to the process of step S102. At this time, the control unit 120 erases the individual definition information stored in the RAM. The control unit 120 repeatedly executes the main process until end operation of the main process is input. After the main process ends, the multi-function device 100 returns to the standby state. The relay server 200 may be configured to transmit a standby instruction to the multi-function device 100. In this case, if receiving the standby instruction, the multi-function device 100 ends the main process.

On the other hand, when the manipulated key is a key unique to the screen type (S116: YES), the control unit 120 determines whether the manipulated key is a key for changing the display order of the object images (S132). An example of key for changing the display order of the object images includes an object image moving key K2.

Figure 11A:
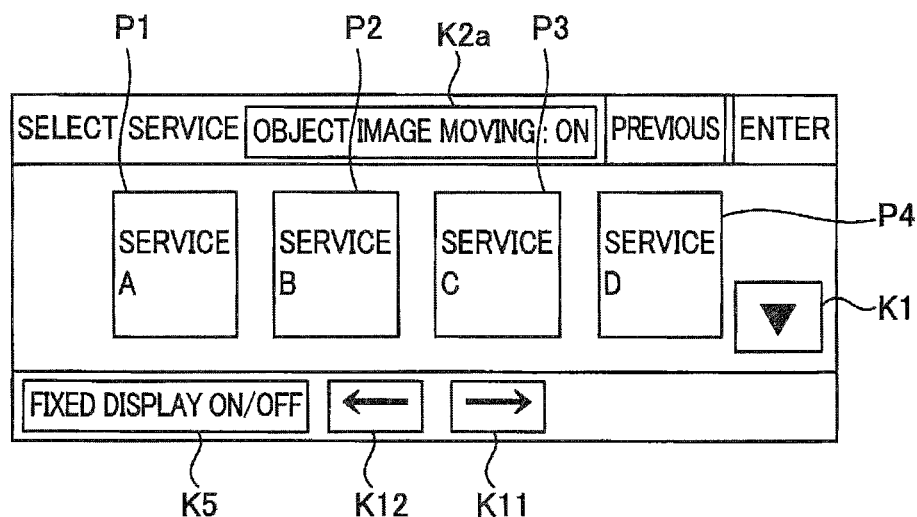
FIG. 11A is an example of display on a screen.

When the manipulated key is the object image moving key K2 (S132: YES), the control unit 120 executes the object image rearranging process (S134). The object image rearranging process will be explained in a more specific manner. When the object image moving key K2 is touched, transition is made to a rearranging process screen. For example, when the object image moving key K2 is touched on the screen of FIG. 10A, transition is made to the screen of FIG. 11A. In the screen of FIG. 11A, the fixed display ON/OFF switch key K5, the right moving key K11, and the left moving key K12 are newly displayed. Instead of the object image moving key K2, the object image moving key K2a is displayed. The object image moving key K2a is a key indicating that the object image rearranging process is being executed.

Figure 11B:
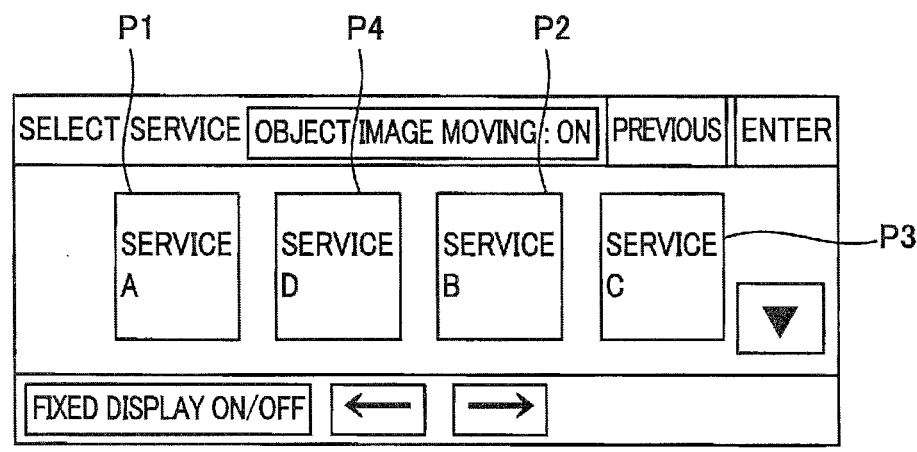
FIG. 11B is an example of display on the screen.

In this case, for example, a case that the object image P4 is moved will be explained. When the object image P4 is touched as a moving target object image, and then the left moving key K12 is touched once, the display position of the object image P4 is interchanged with an object image adjacent to the left side of the object image P4. When the left moving key K12 is touched twice, the state as illustrated in FIG. 11B is obtained. More specifically, when the left moving key K12 is touched twice, the display order of the object image P4 can be raised by two levels in the multi-function device-side display order information. Then, with the 'ENTER' key being touched, the object image rearranging process is terminated. When the object image rearranging process is terminated, the control unit 120 stores the changed multi-function device-side display order information (see FIG. 11C) to the storage unit 130. The multi-function device-side display order information includes the unique number for identifying the individual definition information on which the object image rearranging process is performed (see region R31), and the rearranged list (see region R32).

Figures 11C, 11D:
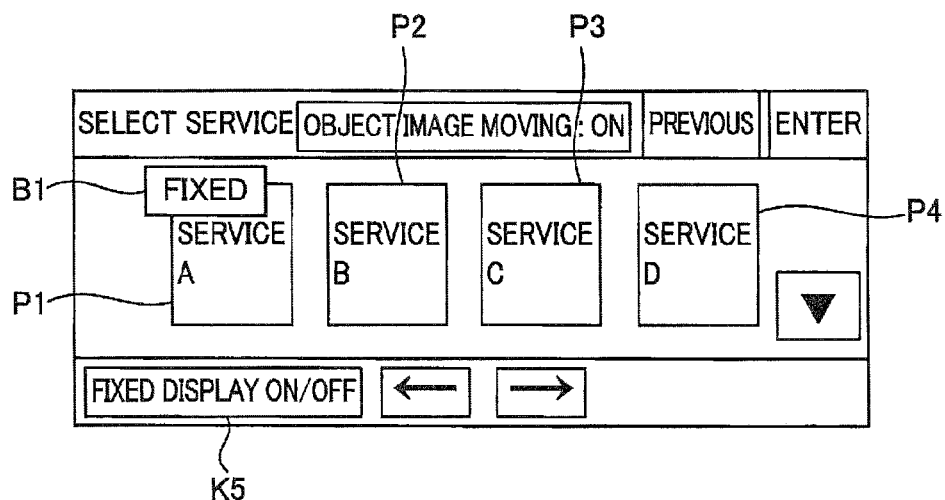
FIG. 11C is an example of multi-function device-side display order information.
FIG. 11D is an example of display on a screen.
Figure 11E:
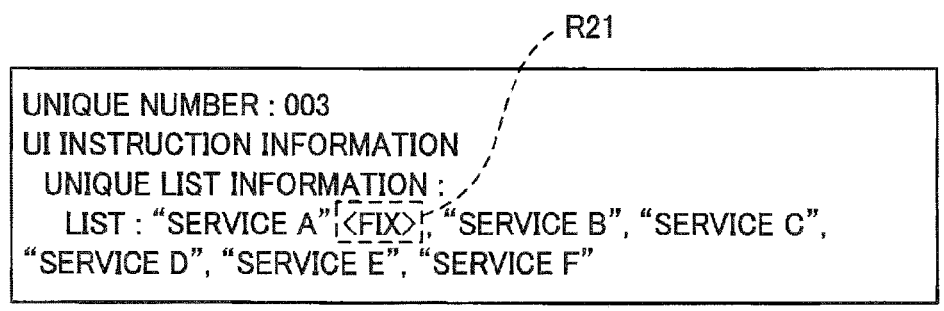
FIG. 11E is an example of multi-function device-side display order information.

When the manipulated key is determined to be the fixed display ON/OFF switch key K5 in S132 (S132: YES), the control unit 120 executes the object image fixed display process (S134). The object image fixed display process will be explained in a more specific manner. For example, a case that the object image P1 is displayed with the fixed object image priority display will be explained. When the fixed display ON/OFF switch key K5 is touched after the object image P1, i.e., the fixed target object, is touched in the screen of FIG. 11A, a balloon image B1 "fixed" is displayed as illustrated in FIG. 11D. Then, as shown in the multi-function device-side display order information of FIG. 11E, the fixed display attribute is attached to the object image P1 (see region R21). Accordingly, the display order of the object image P1 can be fixed at the highest order.

Figure 11F:
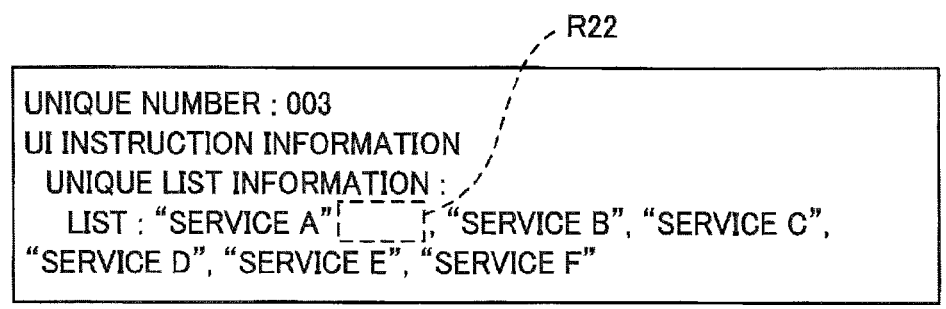
FIG. 11F is an example of multi-function device-side display order information.

A case that the fixed display of the object image P1 is cancelled will be explained. When the fixed object image P1 is touched in the screen of FIG. 11D and then the fixed display ON/OFF switch key K5 is touched, the balloon image B1 "fixed" is erased as illustrated in FIG. 11A. Then, as shown in the multi-function device-side display order information of FIG. 11F, the fixed display attribute attached to the object image P1 is deleted (see region R22). Accordingly, the state in which the display order of the object image P1 is fixed at the highest order can be cancelled.

More than one object images that can be displayed in the fixed manner may be provided. In this case, multiple object images which continue successively from the object image of which display order is the highest order may be configured to be displayed in the fixed manner. For example, in the screen of FIG. 11D, the object images P1 and P2 may be displayed in a fixed manner, or the object images P1 to P3 may be displayed in a fixed manner.

When the manipulated key is determined not to be the object image moving key in S132 (S132: NO), the control unit 120 determines whether the manipulated key is the history ON/OFF switch key K3 (S142). When the unique number of the screen that is currently being displayed on the current display unit 150 is not stored in the storage unit 130 as the history ON unique number, the screen that is currently being displayed is determined to be a screen in which the history priority display is not performed. In this case, when the manipulated key is the history ON/OFF switch key K3, it is determined that setting is made to perform the history display in the screen that is currently being displayed (S144: history ON). Then, the control unit 120 stores the unique number of the screen that is currently being displayed is stored as the history ON unique number to the storage unit 130 (S148).

On the other hand, when the unique number of the screen that is currently being displayed on the display unit 150 is stored as the history ON unique number in the storage unit 130, the screen that the screen that is currently being displayed is determined to be a screen in which the history priority display is performed. In this case, when the manipulated key is the history ON/OFF switch key K3, it is determined that setting is made so as not to perform the history display in the screen that is currently being displayed (S144: history OFF). Then, the control unit 120 deletes the history ON unique number corresponding to the screen that is currently being displayed from the storage unit 130 (S146).

On the other hand, when the operated key is a key unique to the screen type (NO in step S142), in step S150, the control unit 120 executes a process unique to the screen type. For example, when a number of service names are displayed in the screen shown in FIG. 10A, if the 'DOWN' key K1 is operated, the control unit 120 displays a list of a plurality of next service names. In this list display state, if any key representing a selection choice is operated, specifically, if a key representing 'SERVICE A' is operated to select the service A as a selection choice, the control unit 120 stores an item number representing the service A in the RAM. Since the service A is displayed at the top of the list, the item number is '1'. Further, the control unit 120 stores a value, which has been input in the input box in the screen shown in FIG. 10D, in the RAM. Specifically, if the input value is '200', the control unit 120 stores 200 as input character string information in the RAM, and if the input value is '300', the control unit 120 stores 300 as input character string information in the RAM. In the case of the non-touch-panel model, if any one of the 'CLEAR' key, the left arrow key, the right arrow key, and the item selection key is operated to change the value displayed in the input box as described above, the control unit 120 appropriately executes the process unique to the screen type. After executing step S150, the control unit 120 returns to the process of step S114.

<Screen Information Generating Process>

Figure 6:
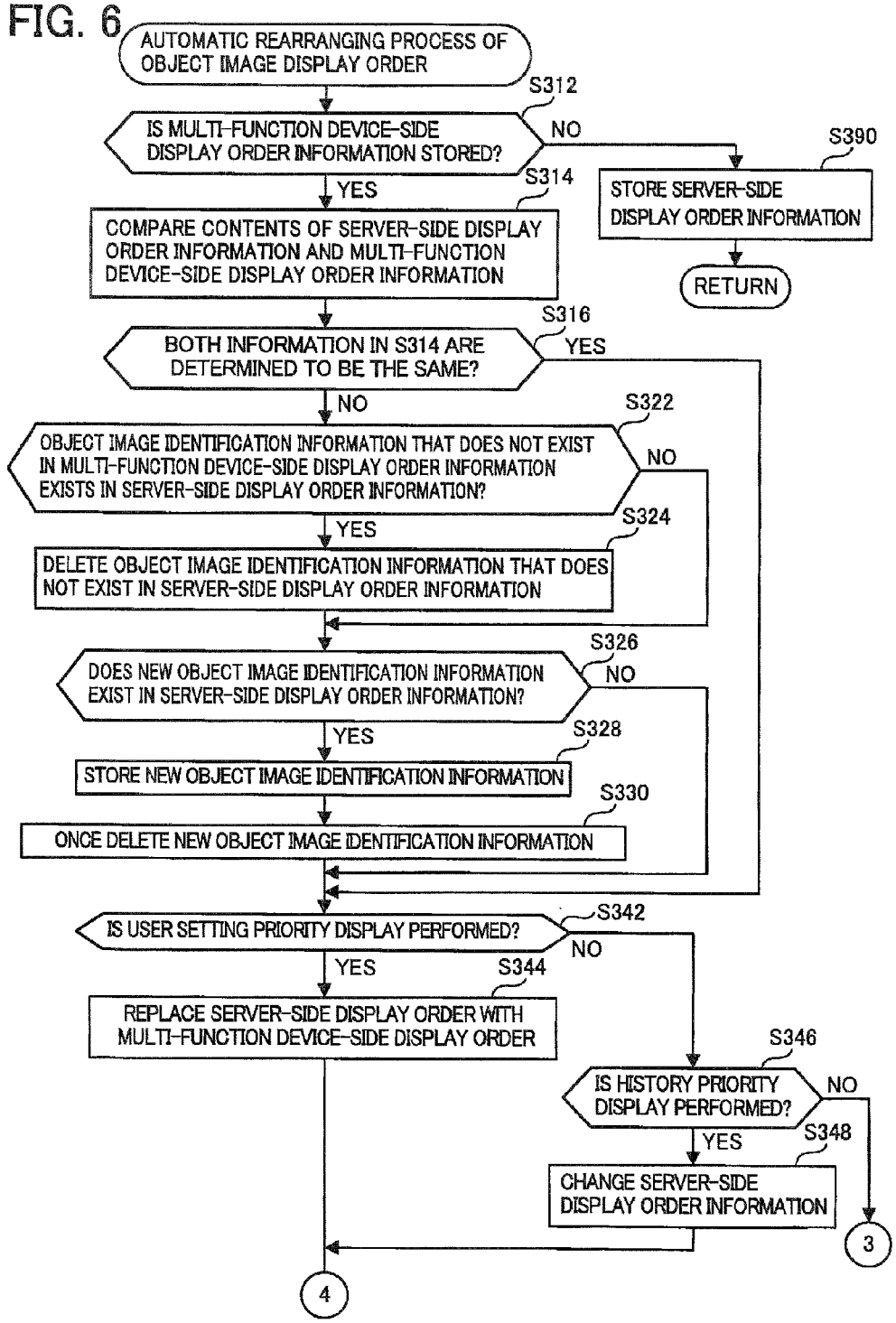
FIG. 6 is a flowchart illustrating automatic rearranging process of object image display order.
Figure 7:
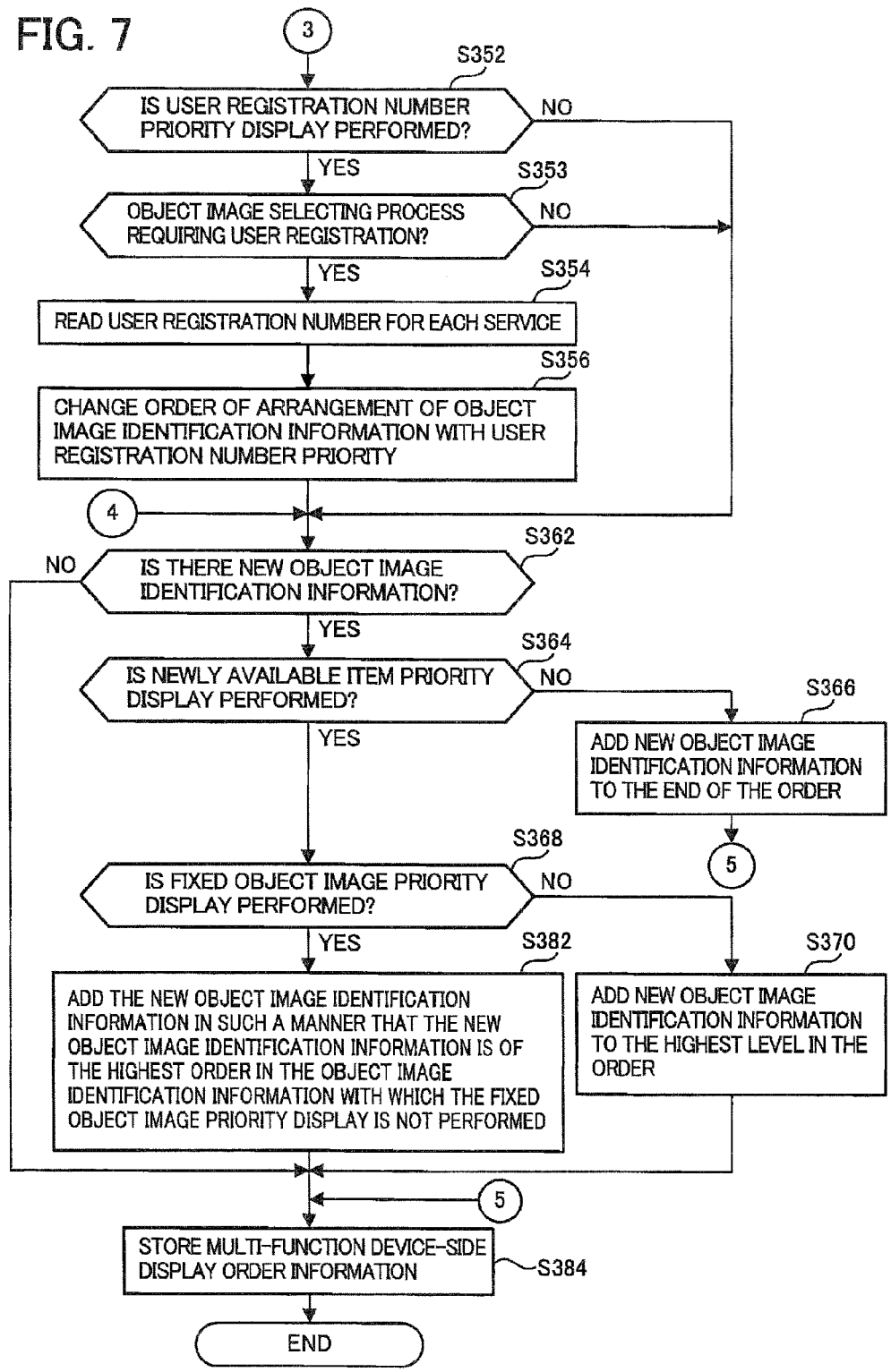
FIG. 7 is a flowchart illustrating the automatic rearranging process of the object image display order.

The screen information generating process executed in step S110 of the main process shown in FIG. 3 will be described with reference to FIGS. 5 to 7. When starting the screen information generating process, in step S194, the control unit reads UI instruction information of the individual definition information stored in the RAM.

In S196, the control unit 120 determines whether a list included in the individual definition information received from the relay server 200 is a list of order change target. More specifically, a determination is made as to whether the unique number for identifying the individual definition information received from the relay server 200 matches the unique number of any one of pieces of multi-function device-side display order information stored in the storage unit 130. When the unique number for identifying the individual definition information received from the relay server 200 is determined to match the unique number of any one of pieces of multi-function device-side display order information stored in the storage unit 130 (S196: YES), the process proceeds to S198. When the unique number for identifying the individual definition information received from the relay server 200 is determined not to match the unique number of any one of pieces of multi-function device-side display order information stored in the storage unit 130 (S196: NO), the process proceeds to S197.

In S197, the control unit 120 determines whether the user registration number priority display is performed or not (S352). This determination may be made on the basis of whether the user registration number priority flag stored in the storage unit 130 is "ON" or not. When the user registration number priority display is not performed (S197: NO), S202 is subsequently performed, and when the user registration number priority display is performed (S197: YES), S198 is subsequently performed. In S198, the control unit 120 executes automatic rearranging process of object image display order.

The content of the automatic rearranging process of the object image display order performed in S198 will be explained with reference to FIGS. 6 and 7. The automatic rearranging process of the object image display order is process for rearranging the display order of the object image identification information included in the server-side display order information (i.e., a list included in the individual definition information received from the relay server 200), on the basis of the multi-function device-side display order information that has been stored.

In S312, the control unit 120 determines whether the storage unit 130 stores the multi-function device-side display order information corresponding to the server-side display order information. This determination may be made on the basis of whether the multi-function device-side display order information having the same number as the unique number of the individual definition information is stored or not. When the multi-function device-side display order information corresponding to the server-side display order information is determined not to be stored (S312: NO), the control unit 120 stores the server-side display order information received from the relay server 200 to the storage unit 130 as the multi-function device-side display order information (S390). Then, the process returns to S202 of FIG. 5.

On the other hand, when the storage unit 130 is determined to store the multi-function device-side display order information corresponding to the server-side display order information (S312: YES), the control unit 120 compares the contents of the server-side display order information and the multi-function device-side display order information stored in the storage unit 130 (S314). In S316, the control unit 120 determines whether the contents of the information of them both are completely the same or not. When the contents of the information of them both are determined to be completely the same (S316: YES), S342 is subsequently performed, and when the contents of the information of them both are determined not to be completely the same (S316: NO), S322 is subsequently performed. In S322, the control unit 120 determines whether deletion-target object image identification information exists in the server-side display order information. More specifically, a determination is made as to whether object image identification information that does not exist in the multi-function device-side display order information exists in the server-side display order information. When object image identification information that does not exist in the multi-function device-side display order information is determined not to exist in the server-side display order information (S322: NO), S326 is subsequently performed, and when object image identification information that does not exist in the multi-function device-side display order information is determined to exist in the server-side display order information (S322: YES), S324 is subsequently performed. In S324, the control unit 120 deletes the deletion-target object image identification information from the server-side display order information. Then, S326 is subsequently performed.

In S326, the control unit 120 determines whether new object image identification information exists in the server-side display order information. The new object image identification information is object image identification information that does not exist in the multi-function device-side display order information stored in the storage unit 130 but exists in the server-side display order information. When new object image identification information is determined not to exist (S326: NO), S342 is subsequently performed, and when new object image identification information is determined to exist (S326: YES), S328 is subsequently performed. In S328, the control unit 120 stores the new object image identification information to the storage unit 130. In S330, the control unit 120 once deletes only the new object image identification information from the server-side display order information. Then, S342 is subsequently performed.

In S342, the control unit 120 determines whether an object image is determined to be displayed with the user setting priority display. This determination may be made on the basis of whether the user setting priority flag stored in the storage unit 130 is "ON" or not. When the user setting priority display is determined to be performed (S342: YES), the control unit 120 replaces the server-side display order indicated by the server-side display order information with the multi-function device-side display order indicated by the multi-function device-side display order information stored in the storage unit 130 (S344).

In S344, a determination is also made as to whether the fixed object image priority display is performed or not. This determination may be made on the basis of whether the same character string as the character string identified by the fixed object identification information stored in the storage unit 130 exists in the list included in the server-side display order information. This determination may be made on the basis of whether object image identification information having fixed display attribute attached thereto exists in the multi-function device-side display order information or not. In a case that setting is made to perform the fixed object image priority display, and when object image identification information which is displayed with the fixed object image priority display exists therein, the display order of the object image identification information which is displayed with the fixed object image priority display is changed to the highest order in the server-side display order information. Then, S362 is performed.

On the other hand, when the user setting priority display is determined not to be performed in S342 (S342: NO), the control unit 120 determines whether the history priority display is performed or not (S346). This determination may be made on the basis of whether the unique number of the individual definition information received from the relay server 200 matches any one of history ON unique numbers stored in the storage unit 130 when the history priority flag stored in the storage unit 130 is "ON". When the history priority display is performed (S346: YES), S348 is subsequently performed. In S348, when object image identification information which is displayed with the fixed object image priority display exists, the control unit 120 excludes the object image identification information which is displayed with the fixed object image priority display from the target of order change. This determination may be made using the fixed object identification information stored in the storage unit 130. Then, the control unit 120 changes the server-side display order information in such a manner that object image identification information included in the server-side display order information which is selected by the user frequently is arranged in the higher level in the display order. Then, S362 is subsequently performed.

On the other hand, when the history priority display is determined not to be performed in S346 (S346: NO), the control unit 120 determines whether the user registration number priority display is performed or not (S352). This determination may be made on the basis of whether the user registration number priority flag stored in the storage unit 130 is "ON" or not. When the user registration number priority display is determined not to be performed (S352: NO), S362 is subsequently performed. On the other hand, when the user registration number priority display is determined to be performed (S352: YES), the control unit 120 determines whether object image identification information for selecting process requiring user registration is included in the server-side display order information or not (S353). This determination may be made on the basis of whether any of one of character strings "service A" to "service F" is included in the list of the server-side display order information. When object image identification information for selecting process requiring user registration is determined not to be included in the server-side display order information (S353: NO), S362 is subsequently performed, and when object image identification information for selecting process requiring user registration is determined to be included in the server-side display order information (S353: YES), S354 is subsequently performed.

In S354, the control unit 120 reads the user registration number for each service from the user registration number information stored in the storage unit 130. In S356, the control unit 120 rearranges the arrangement of the object image identification information so that object image identification information of which user registration number is high in multiple pieces of object image identification information included in the server-side display order information is arranged at the higher level in the display order. Then, S362 is subsequently performed.

In S362, the control unit 120 determines whether new object image identification information is included in the server-side display order information or not. This determination may be made on the basis of whether new object image identification information is stored in the storage unit 130 or not in S328. When new object image identification information is determined not to be included therein (S362: NO), S384 is subsequently performed. When new object image identification information is determined to be included (S362: YES), S364 is subsequently performed.

In S364, the control unit 120 determines whether the newly available item priority display is performed or not. This determination may be made on the basis of whether the newly available item priority flag stored in the storage unit 130 is "ON" or not. When the newly available item priority display is not to be performed (S364: NO), the control unit 120 adds the new object image identification information stored in S328 to the end of the object image identification information included in the server-side display order information (S366).

On the other hand, when the newly available item priority display is to be performed (S364: YES), S368 is subsequently performed, and the control unit 120 determines whether the fixed object image priority display is to be performed or not. This determination may be made in accordance with the method described in S344, and description thereabout is omitted here. When the fixed object image priority display is not to be performed (S368: NO), S370 is subsequently performed, and the control unit 120 adds the new object image identification information stored in S328 to the highest order of the object image identification information included in the server-side display order information (S370). On the other hand, when the fixed object image priority display is to be performed (S368: YES), S382 is subsequently performed. The control unit 120 adds the new object image identification information stored in S328 so that it is of the highest order in the object image identification information except the object image identification information with which the fixed object image priority display is performed (S382).

In S384, the control unit 120 stores the server-side display order information of which display order has been determined to the storage unit 130 as the multi-function device-side display order information. Then, S202 of FIG. 5 is performed back again.

In step S202, the control unit 120 reads the template information stored in the storage unit 130 to the RAM. The template information has a configuration shown in FIGS. 12A and 12B. Upon reading the template information, the control unit 120 specifies the screen type according to the UI instruction information, and extracts unique screen type information according to the specified screen type, from the template information. Specifically, a case that the specified screen type is the list type, the control unit 120 extracts information representing what the unique key is, bitmap information representing the '-(UP)' key and the '-(DOWN)' key and the like shown in FIGS. 12A and 12B.

Figure 3:
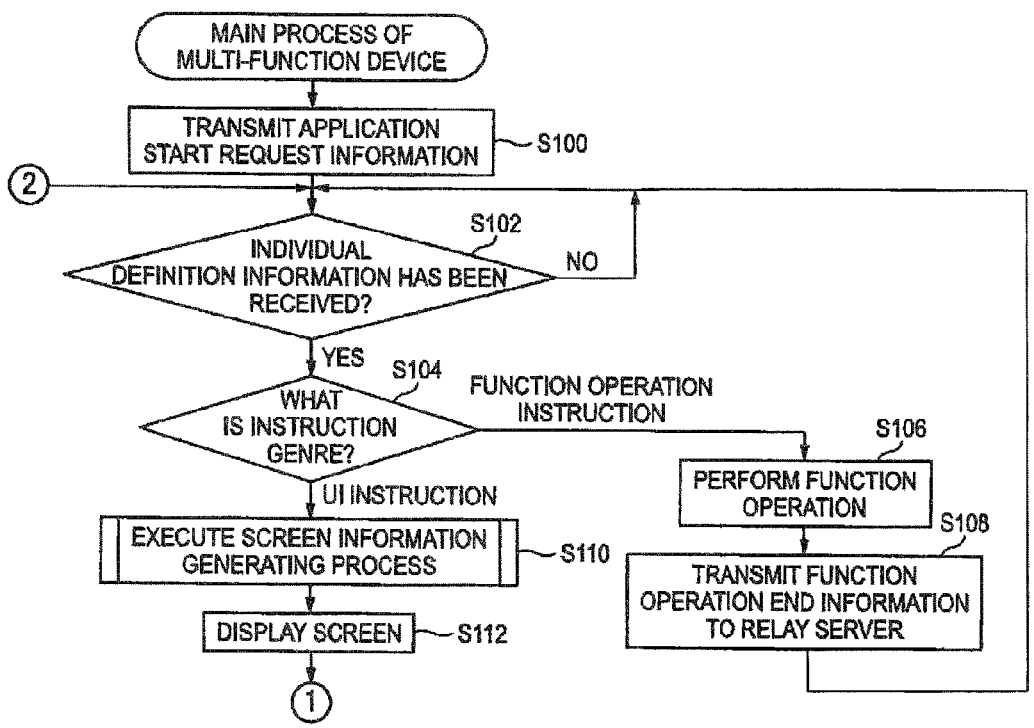
FIG. 3 is a flowchart illustrating main processing executed by the multi-function device.

In step S204, based on the information extracted from the template information, the control unit 120 specifies a key unique to the screen type, and generates screen information representing a portion of the screen displayed in step S112 of FIG. 3. Specifically, the control unit 120 generates the screen information for displaying the '-(UP)' key, the '-(DOWN)' key, and the like, specified according to the information representing what the unique key is, on the display unit 150. At this time, the control unit 120 incorporates predetermined information included in the UI instruction information, in the screen information. The incorporated predetermined information includes not only information described as a list, the initial value for the input box, and a message, but also, information described as the selection method, the maximum number of characters, and the minimum number of characters.

After executing step S204, in step S206, the control unit 120 adds a character string, described as the title in the UI instruction information, to the screen information generated in step S204. Then, in step S208, the control unit 120 validates the operation key for a screen transition, described as a valid key in the UI instruction information, according to the template information. Herein, the validating means the following process. That is, if the multi-function device 100 is a touch panel model, the validating means that the key assigned to instruction operation of each of the 'ENTER' key, the 'PREVIOUS' key, and the 'NEXT' key described as a valid key in the UI instruction information is made operable, and is included in the screen information. If the multi-function device 100 is a non-touch-panel model, the validating means that instruction operation of the 'ENTER' key, the 'PREVIOUS' key, or the 'NEXT' key is assigned any hard key included in the operation unit 180. Further, when it is possible to light up the hard keys, the hard key to which the instruction operation of the 'ENTER' key, the 'PREVIOUS' key, or the 'NEXT' key is assigned is lit up. In step S208, the control unit 120 makes operable the 'UP' key, the 'DOWN' key, the left arrow key, the right arrow key, the 'CLEAR' key, and the like according to the unique screen type information of the template information. After executing step S208, the control unit 120 returns to the process of step S112 of FIG. 9.

Specific examples executed in steps S204 to S208 will be described with reference to FIGS. 13A and 13B. In the description based on FIG. 13B, a case that the multi-function device 100 is a touch panel model is exemplified. For example, when the individual definition information stored in the RAM is the individual definition information shown in FIG. 13A, first, in step S204, the control unit 120 extracts bitmap information, representing a basic screen of a list, as basic screen information from the template information shown in FIGS. 12A and 12B, according to the screen type representing the list type (see (A) of FIG. 13B). In the unique screen type information (which is the list type) of the template information shown in FIGS. 12A and 12B, the 'UP' key and the 'DOWN' key are associated as unique keys. Therefore, the control unit 120 extracts bitmap information representing the 'UP' key and the 'DOWN' key, and generates the screen information. This screen information is generated such that the bitmap information representing the 'UP' key and the 'DOWN' key are disposed at predetermined positions of bitmap information representing a basic screen according to information representing the positions of the 'UP' key and the 'DOWN' key included in the unique screen type information (which is the list type). In other words, the control unit 120 generates screen information representing the screen shown in (A) of FIG. 13B. Then, the control unit 120 disposes 'SERVICE A' and 'SERVICE B', described as selection choices in the unique list information of the UI instruction information, at predetermined positions according to information representing positions of selection choices included in the unique screen type information (which is the list type) shown in FIGS. 12A and 12B. In other words, in step S204, the control unit 120 generates screen information representing a screen shown in (B) of FIG. 13B. In this screen information, 'SERVICE A' and 'SERVICE B' are validated as selection choices of the list. The control unit 120 incorporates information representing 'SELECTION OF ONE CHOICE', described as the selection method in the UI instruction information, in the generated screen information.

Next, in step S206, the control unit 120 disposes the title 'SERVICE SELECTION' at a predetermined position according to information representing the position of the title included in the template information shown in FIGS. 12A and 12B (see (C) of FIG. 13B). That is, the control unit 120 generates screen information representing a screen shown in (C) of FIG. 13B. Subsequently, in step S208, for the 'ENTER' key which is valid in the UI instruction information, the control unit 120 extracts bitmap information representing the 'ENTER' key, associated with determining operation, included in operation key information from the operation key information of the template information of FIGS. 12A and 12B (see (D) of FIG. 13B). That is, the control unit 120 generates screen information representing a screen shown in (D) of FIG. 13B. In this screen information, the 'ENTER' key is validated as a key for inputting a transition instruction for a screen transition. As the key for inputting a transition instruction, in addition to the 'ENTER' key, the 'PREVIOUS' key and the 'NEXT' key may be exemplified.

<Operation Result Information Generating Process>

Figure 8:
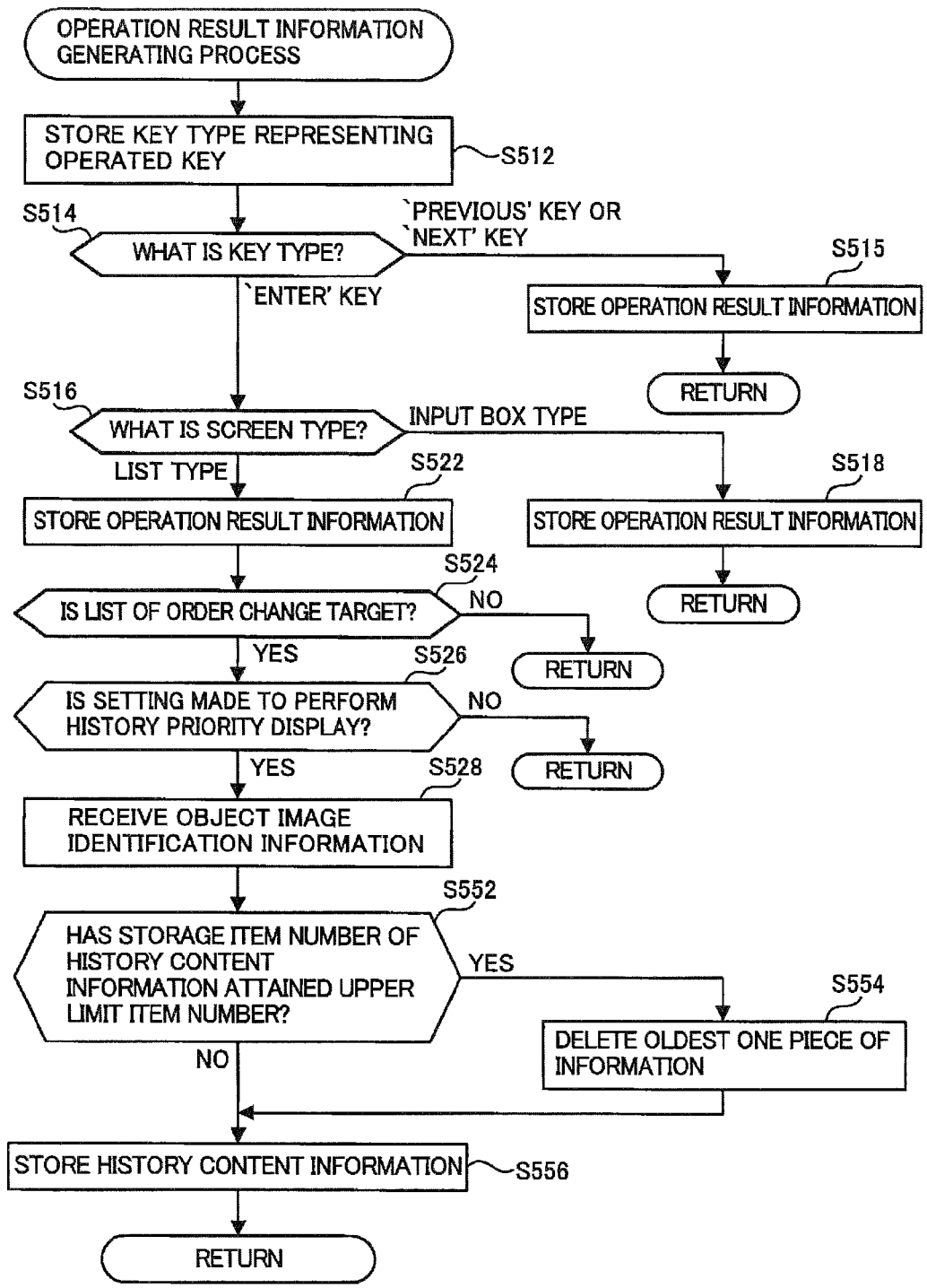
FIG. 8 is a flowchart illustrating operation result information generating process.

The operation result information generating process executed in step S122 of the main process shown in FIG. 4 will be described with reference to FIG. 8. When starting the operation result information generating process, the control unit 120 stores a key type, representing the key which has been operated in step S114 of FIG. 4 and has been determined as valid in step S120, in the RAM. The key which has been operated in step S114 and has been determined as valid in step S120 is any one of the 'ENTER' key, the 'PREVIOUS' key, and the 'NEXT' key. For example, in step S512, the control unit 120 stores the key type representing the 'ENTER' key. Subsequently, in step S514, the control unit 120 makes determination on the key type. When the key type represents the 'PREVIOUS' key or the 'NEXT' key ('PREVIOUS' key or 'NEXT' key in step S514), the control unit 120 proceeds to a process of step S515.

In step S515, the control unit 120 generates operation result information including the key type stored in step S512 and a unique number matching the unique number described in the individual definition information stored in the RAM, and stores the operation result information in the internal RAM of the control unit 120. After executing step S515, the control unit 120 returns to the process of step S124 of FIG. 4.

Meanwhile, when the key type represents the 'ENTER' key ('ENTER' key in step S514), in step S516, the control unit 120 makes determination on the screen type of the screen displayed on the display unit 150 in step S112 of FIG. 3. The control unit 120 makes the determination of step S516 according to the UI instruction information of the individual definition information stored in the RAM. When the screen type is a message type, since the 'ENTER' key is not included in the screen of the display unit 150 (see FIG. 10C), the determination of step S516 is made only on a list type and an input box type.

When the screen type is an input box type (input box type in step S516), the control unit 120 stores the input character string information as the determined information in the RAM. Then, in step S518, the control unit 120 generates operation result information including the key type stored in step S512, the determined information, and a unique number matching the unique number described in the individual definition information stored in the RAM, and stores the operation result information in the internal RAM of the control unit 120. For example, when the initial value of 200 dpi is determined in FIG. 10D, '200' is stored in step S150 of FIG. 4. When the resolution has been changed to 300 dpi, '300' is stored in step S150 of FIG. 4. That is, the control unit 120 stores the '200' or '300' as the determined information in the RAM. Next, the control unit 120 generates operation result information including the key type representing the 'ENTER' key, '200' or '300' as the determined information, and a unique number matching the unique number described in the individual definition information ('013' described in the individual definition information shown in FIG. 9M) stored in the RAM.

When the screen type is the list type (list type in step S516), the control unit 120 stores an item number of a selection choice selected from the selection choices included in the list, in the RAM. Then, in step S522, the control unit 120 generates operation result information including the key type stored in step S512, the determined information and a unique number matching the unique information described in the individual definition information stored in the RAM, and stores the operation result information in the internal RAM of the control unit 120. For example, when 'SERVICE A' is selected in FIG. 10A, an item number '1' representing the service A is stored in the RAM in step S150 of FIG. 4. That is, the control unit 120 stores '1' as the determined information in the RAM. Next, the control unit 120 generates operation result information including the key type representing the 'ENTER' key stored in step S512, '1' as determined information, and a unique number matching the unique number described in the individual definition information ('003' described in the individual definition information shown in FIG. 9C) stored in the RAM. Here, the determined information means determined information determined to be stored in the RAM by operating the 'ENTER' key, among the selection choices of the list and an input character string in the input box displayed in the screens of the display unit 150.

In S524, the control unit 120 determines whether the list included in the individual definition information of the screen currently displayed is a list of order change target. This determination is the same as the content of determination explained in S196, and therefore, explanation thereabout is omitted. When it is not the list of order change target (S524: NO), S124 is performed back again, and when it is the list of order change target (S524: YES), S526 is subsequently performed.

In S526, the control unit 120 determines whether setting has been made to perform the history priority display in the screen currently displayed. This determination is the same as the content of determination explained in S346, and therefore, explanation thereabout is omitted. When the setting has not been made to perform the history priority display in the screen currently displayed (S526: NO), S124 is performed back again, and when the setting has been made to perform the history priority display in the screen currently displayed (S526: YES), S528 is subsequently performed.

In S528, the control unit 120 receives the object image identification information of the object image selected in S120. In S552, the control unit 120 determines whether the storage item number of the history content information stored in the storage unit 130 has attained the upper limit item number. When the storage item number of the history content information stored in the storage unit 130 has not yet attained the upper limit item number (S552: NO), S556 is subsequently performed, and when the storage item number of the history content information stored in the storage unit 130 has attained the upper limit item number (S552: YES), S554 is subsequently performed. In S554, the control unit 120 deletes the oldest piece of information in the information stored in the history content information. Then, S556 is subsequently performed. In S556, the control unit 120 stores the object image identification information received in S528 to the storage unit 130 as the history content information. Then, S124 of FIG. 4 is performed back again.

A specific example of process of S524 to S556 will be explained. For example, a case that the upper limit item number is five, and the screen currently displayed is the screen of FIG. 10A will be explained. Hereinafter explained is the case that the content of the history content information is "'service B', 'service B', 'service C', 'service B', 'service C'", which are in the descending order of the history. In this case, when the object image selected in S120 is the object image of "service A", the character string of "service A" is obtained (S528). The storage item number of the history content information has attained upper limit item number (S552: YES), and therefore, the oldest piece of information "service C" is deleted from the history content information (S554). Then, the character string of "service A" obtained in S528 is stored as the history content information to the storage unit 130. Accordingly, the content of the history content information is changed to "'service A', 'service B', 'service B', 'service C', 'service B'".

<Main Process Executed by Relay Server>

Figure 14:
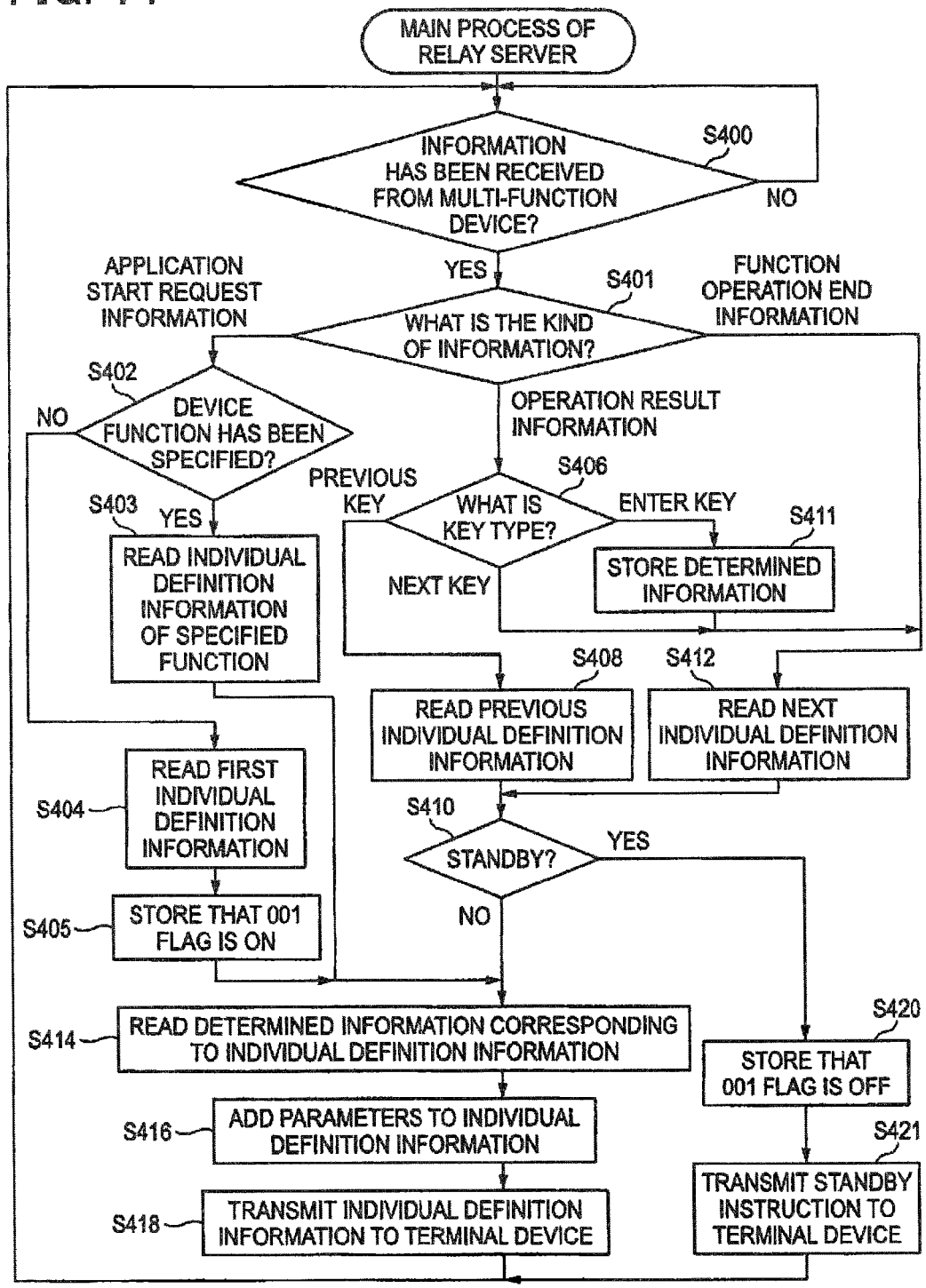
FIG. 14 is a flow chart illustrating a main process executed by the relay server.

A main process executed by the relay server 200 will be described with reference to FIG. 14. The control unit 220 of the relay server 200 stands by until receiving predetermined information from the multi-function device 100 through the network 400 (No in step S400). When the main process shown in FIG. 14 starts, the control unit 220 of the relay server 200 stores that a 001 flag is 'ON' in the RAM. The 001 flag will be described below in detail. The control unit 220 controls the communication unit 210 to receive the predetermined information. When receiving the predetermined information (Yes in step S400), in step S401, the control unit 220 determines the type of the received predetermined information. The received predetermined information is stored in the RAM or the like configuring the control unit 220. Herein, the received predetermined information may be stored as it is, or the received predetermined information may be analyzed and be stored in a format appropriate for the subsequent process. Alternatively, the received predetermined information may be stored in the storage unit 230. The received predetermined information is any one of the application start request information, the function operation end information, and the operation result information. The application start request information is transmitted in step S100 of FIG. 3, the function operation end information is transmitted in step S108 of FIG. 3, and the operation result information is transmitted in step S124 of FIG. 4. When the predetermined information is the application start request information (application start request information in step S401), in step S402, the control unit 220 determines whether any information specifying a device function is included in the application start request information. When any information specifying a device function is included in the application start request information (Yes in step S402), in step S403, the control unit 220 reads individual definition information corresponding to the function specified by the application start request information, into the RAM. The unique number of the individual definition information corresponding to each function is stored in the storage unit 230. Specifically, the control unit 220 reads the unique number of the individual definition information corresponding to the function specified by the application start request information, from the storage unit 230 into the RAM. Subsequently, the control unit 220 reads tree information shown in FIG. 15A, from the storage unit 230 into the RAM. The control unit 220 reads the individual definition information registered in correspondence with the unique number having been read into the RAM in the tree information, from the storage unit 230 into the RAM. For example, when the application start request information specifies the copy function, the control unit 220 reads the individual definition information corresponding to the unique number '013', from the storage unit 230 into the RAM. When any information specifying a device function is not included in the application start request information (No in step S402), in step S404, the control unit 220 reads the first individual definition information, that is, the individual definition information for displaying a top screen of a remote UI on the display unit 150 of the display unit 150, into the RAM. The individual definition information having the smallest unique number becomes the first individual definition information. According to the tree information shown in FIG. 15A, the individual definition information having the unique number '001' (See FIG. 9A) is read from the storage unit 230 into the RAM.

Subsequent to step S404, in step S405, the control unit 220 stores that the 001 flag is 'ON', in the RAM. The 001 flag is a flag for storing a status in which the relay server 200 transmits the individual definition information having the unique number '001' to the multi-function device 100, in the relay server 200. As an example of a process of the control unit 220 according to the ON or OFF of the 001 flag, when the operation result information including the key type representing the 'PREVIOUS' key, and the unique number '013' (see FIG. 9M) has been received through the communication unit 110 and the 001 flag is 'ON', in step S408, the individual definition information having the unique number '001' is read from the storage unit 230 into the RAM for displaying the top screen of the remote UI on the display unit 150 of the multi-function device 100. In contrast, when the operation result information including the key type representing the 'PREVIOUS' key, and the unique number '013' (see FIG. 9M) has been received and the 001 flag is 'OFF', the control unit 220 stores that the 001 flag is 'OFF', in the RAM in step S420 without reading the individual definition information in step S408 to be described below, and controls the communication unit 210 in step S421, to transmit a standby instruction for ending the main process of the multi-function device 100 to make the multi-function device 100 the standby state, to the multi-function device 100.

When the predetermined information is the function operation end information (function operation end information in step S401), the control unit 220 proceeds to a process of step S412. When the predetermined information is the operation result information (operation result information in step S401), in step S406, the control unit 220 determines what the key type included in the received operation result information is. When the key type represents the 'PREVIOUS' key ('PREVIOUS' key in step S406), in step S408, the control unit 220 reads the previous individual definition information from the storage unit 230 into the RAM. Specifically, the control unit 220 may read the tree information shown in FIG. 15A into the RAM (the entire tree information read in step S403 or S404 may be used, and this is same in step S412 to be described below), and specifies the previous unique number of the unique number included in the operation result information, according to the tree information. For example, when the unique number included in the operation result information is 004 (see FIG. 9D), the control unit 220 specifies the unique number '003' according to the tree information. When the unique number included in the operation result information is '006' (see FIG. 9F), the tree information shows the previous unique number is undetermined. In this case, the tree information shows that the previous unique number is an undetermined 006A. In this case, the control unit 220 reads an undetermined table shown in FIG. 15B, from the storage unit 230 into the RAM. Subsequently, the control unit 220 specifies the previous unique number according to the undetermined table. In the undetermined 006A, when the determined information included in the operation result information having the unique number '003' is 'SERVICE A', '004' is specified as the previous unique number, and when the determined information included in the operation result information having the unique number '003' is 'SERVICE B', '005' is specified as the previous unique number. As described above, when the tree information represents the previous unique number as 'UNDETERMINED ***' like the 'undetermined 006A', the control unit 220 specifies the previous unique number according to the undetermined table shown in FIG. 10B. Then, the control unit 220 reads the individual definition information (previous individual definition information) including the specified unique number '003' from the storage unit 230 into the RAM.

When the unique number included in the operation result information is '001' (see FIG. 9A), the tree information represents the previous unique number as 'standby'. When the tree information represents the previous unique number as 'standby', the control unit 220 does not read the previous individual definition information.

When the key type represents the 'NEXT' key ('NEXT' key in step S406), the control unit 220 proceeds to the process of step S412. When the key type represents the 'ENTER' key ('ENTER' key in step S406), the control unit 220 reads first mapping table shown in FIG. 16A, from the storage unit 230 into the RAM. Further, the control unit 220 extracts the unique number included in the received operation result information. Subsequently, the control unit 220 specifies an item associated with a unique number matching the extracted unique number. Then, in step S411, the control unit 220 stores the determined information included in the operation result information, as setting information associated with the specified item in the setting information table. For example, when the received operation result information includes the key type representing the 'ENTER' key, the determined information 'EXTERNAL SERVICE', and the unique number '001', the control unit 220 specifies an item 'EXTERNAL SERVICE/DEVICE FUNCTION' associated to the unique number '001' according to the first mapping table. Then, the control unit 220 stores the received determined information 'EXTERNAL SERVICE' as setting information corresponding to the item 'EXTERNAL SERVICE/DEVICE FUNCTION' in the setting information table, as shown in FIG. 17. After executing step S411, the control unit 220 proceeds to the process of step S412.

In step S412, the control unit 220 reads the next individual definition information from the storage unit 230 into the RAM. Specifically, like in step S408, the control unit 220 specifies the next unique number of the unique number included in the received operation result information, according to the tree information shown in FIG. 15A and the undetermined table shown in FIG. 15B. For example, when the unique number included in the operation result information is '001' (see FIG. 9A), the control unit 220 recognizes that 'UNDETERMINED 001B' is stored in the tree information. When the determined information included in the operation result information having the unique number '001' represents 'EXTERNAL SERVICE', the control unit 220 specifies '002' as the next unique number according to the undetermined table, and when the determined information included in the operation result information having the unique number '001' represents 'DEVICE FUNCTION', the control unit 220 specifies '012' as the next unique number. When the tree information represents the next unique number as 'UNDETERMINED ***' like the 'undetermined 001B', the control unit 220 specifies the next unique number according to the undetermined table shown in FIG. 15B. When the unique number included in the operation result information is '004' (see FIG. 9D), the control unit 220 specifies '006' as the next unique number according to the tree information.

When the unique number included in the operation result information is '006' (see FIG. 9F), the control unit 220 recognizes that 'UNDETERMINED 006B' is stored in the tree information. The control unit 220 acquires a thumbnail and data name of image data stored in a service providing server for the service, represented by the determined information included in the operation result information having the unique number '003' (the service providing server 300A when the determined information represents 'SERVICE A'), from the service providing server in accordance to the undetermined table. When the acquisition of the thumbnail and the data name ends normally, the control unit 220 specifies a unique number '007' as the next unique number. When the acquisition of the thumbnail and the data name ends erroneously, the control unit 220 specifies a unique number '008' as the next unique number. In this case that the tree information represents the next unique number as 'UNDETERMINED *' and a specific process is shown in the undetermined table, the control unit 220 executes the specific process in accordance to the undetermined table, so as to specify the next unique number corresponding to the executed specific program. Similarly, even when the tree information represents the previous unique number as 'UNDETERMINED *' and a specific process is shown in the undetermined table, the control unit 220 executes the specific process according to the undetermined table, so as to specify the previous unique number corresponding to the executed specific program.

When the unique number included in the operation result information is '009' (see FIG. 9I), the tree information represents the next unique number as 'STANDBY'. In this case that the tree information represents the next unique number as 'STANDBY', the control unit 220 does not read the next individual definition information.

The control unit 220 reads the individual definition information (next individual definition information) including the specified next unique number, from the storage unit 230 into the RAM. After executing step S408 or S414, in step S410, the control unit 220 determines whether the tree information represents the previous unique number or the next unique number as 'STANDBY'. This determination may be made by determining whether the individual definition information has been read in step S408 or S412. When the tree information does not represent the previous unique number or the next unique number as 'STANDBY' (No in step S410), the control unit 220 proceeds to a process of step S414. When the tree information represents the previous unique number or the next unique number as 'STANDBY' (Yes in step S410), the control unit 220 proceeds to a process of step S420.

In step S414, the control unit 220 reads the setting information stored in the setting information table shown in FIG. 17.

Step S414 will be described. The control unit 220 extracts the unique number included in the individual definition information having been read into the RAM in step S404, S408, or S412. Also, the control unit 220 reads the second mapping table shown in FIG. 16B, from the storage unit 230 into the RAM. Next, the control unit 220 determines whether any item corresponding to a unique number matching the extracted unique number is registered in the second mapping table. Then, when any item corresponding to the unique number corresponding to the extracted unique number is registered in the second mapping table, the control unit 220 specifies the item associated with the unique number in the second mapping table. Subsequently, the control unit 220 reads the setting information stored in association with the same item as the specified item in the setting information table. Meanwhile, when any item corresponding to the unique number matching the extracted unique number is not registered in the second mapping table, the control unit 220 does not read the setting information from the setting information table.

After executing step S414, in step S416, the control unit 220 adds a parameter matching the setting information read in step S414, to the individual definition information stored in the RAM. For example, when the individual definition information stored in the RAM is individual definition information having the unique number '007' (see FIG. 9G), in step S414, the control unit 220 specifies a thumbnail list of the image data and a data name list of the image data are specified as items. Then, setting information associated with those specified items is read from the setting information table. Referring to FIG. 17, the thumbnail list of the image data include a first thumbnail, a second thumbnail, a third thumbnail, a fourth thumbnail, and the like, and the data name list of the image data include a first file name, a second file name, a third file name, a fourth file name, and the like. Therefore, in step S416, the thumbnails and the file names are added as parameters for enabling the user of the multi-function device 100 to select the image data. Subsequently, in step S418, the control unit 220 controls the communication unit 210 to transmit the individual definition information stored in the RAM to the multi-function device 100. After executing step S418, the control unit 220 returns to the process of step S400, and repeatedly executes the main process.

In step S420, the control unit 220 stores that the 001 flag is 'OFF', in the RAM. Subsequently, in step S421, the control unit 220 controls the communication unit 210 to transmit a standby instruction to the multi-function device 100.

<GUI for Using Download Service>

Here, a configuration of a GUI for using a download service of the service A in the multi-function device 100 will be described with reference to FIGS. 9A to 9O. For example, a case that the multi-function device-side display order information as illustrated in FIG. 18 is stored in the storage unit 130 will be explained. The unique number of the multi-function device-side display order information of FIG. 18 is "003". A case that the user setting priority flag and the newly available item priority flag are "ON", and the other flags are "OFF" will be explained.

In order to use the download service of the service A, the user touches an application start icon for instructing the relay server 200 to start the remote UI, displayed in the multi-function device 100 which is in the standby state, from the top screen. When doing so, in step S100, the multi-function device 100 transmits the application start request information to the relay server 200 without including any information specifying a device function in the application start request information.

When receiving the application start request information without any information specifying a device function, the relay server 200 transmits the individual definition information having the unique number '001' (see FIG. 9A) to the multi-function device 100.

When receiving the individual definition information having the unique number '001', the multi-function device 100 displays a list screen (not shown) for enabling the user to select whether to use an external service or a function of the multi-function device 100.

When the user selects the external service, the multi-function device 100 transmits the operation result information including the unique number '001', the key type representing the 'ENTER' key, and the determined information representing the external service, to the relay server 200.

When receiving the operation result information including the unique number '001', the key type representing the 'ENTER' key, and the determined information representing the external service, the relay server 200 transmits the individual definition information having the unique number '002' (see FIG. 9B) to the multi-function device 100 according to the tree information and the undetermined table.

When receiving the individual definition information having the unique number '002', the multi-function device 100 displays a list screen (not shown) for enabling the user to select Yes or No regarding whether the user wants to use the external service.

When the user selects Yes, the multi-function device 100 transmits operation result information, including the unique number '002', the key type representing the 'ENTER' key, and the determined information representing Yes, to the relay server 200.

When receiving operation result information, including the unique number '002', the key type representing the 'ENTER' key, and the determined information representing Yes, the relay server 200 transmits the individual definition information having the unique number '003' (see FIG. 9C) to the multi-function device 100 according to the tree information and the undetermined table.

The multi-function device 100 receiving the individual definition information having the unique number "003" (S102: YES, S104: UI instruction) executes the image information generating process (S110). The unique number "003" of the individual definition information received from the relay server 200 is the same as the unique number "003" of the multi-function device-side display order information stored in the storage unit 130 (S196: YES), and therefore, the control unit 120 executes the automatic rearranging process of the object image display order (S198). When the server-side display order information (that is, see the list region R0 included in FIG. 9C) and the multi-function device-side display order information (see FIG. 18) are compared, there is new object image identification information (see the list region R1 included in FIG. 9C) that does not exist in the multi-function device-side display order information but exists in the server-side display order information (S326: YES). Therefore, the character string of "service F" which is the new object image identification information is stored in the storage unit 130 (S328). Then, the character string of "service F" which is the new object image identification information is once deleted from the server-side display order information (S330).

The user setting priority flag is "ON" (S342: YES), and therefore, the user setting priority display is performed. The server-side display order indicated by the server-side display order information (see region R0 of FIG. 9C) is replaced with the multi-function device-side display order indicated by the multi-function device-side display order information stored in the storage unit 130 (see FIG. 18) (S344). At this occasion, the display order of the object image identification information of "service A" having the fixed identification attribute attached thereto (see region R2 of FIG. 18) is set at the highest order. Accordingly, the list indicating the server-side display order is changed as shown in FIG. 19 (see region R3).

Figures 20, 21:
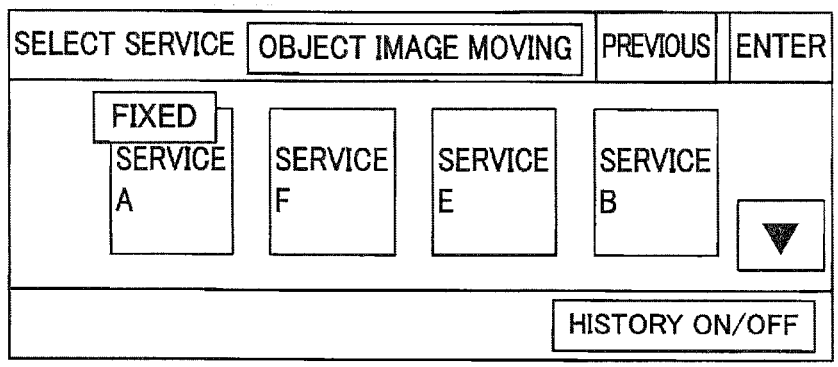
FIG. 20 is an example of a list showing server-side display order.
FIG. 21 is an example of display on a screen.

The server-side display order information includes new object image identification information (S362: YES), and the newly available item priority flag is "ON" (S364: YES), and therefore, the newly available item priority display is performed. The fixed identification attribute is attached to the identification information of the service A in the object image identification information stored in the multi-function device-side display order information (see region R2 of FIG. 18). Therefore, the fixed object image priority display is performed (S368: YES), and therefore, the control unit 120 adds the new object image identification information stored in S328 (character string of "service F") in such a manner that the new object image identification information is of the highest order in the object image identification information excluding the object image identification information with which the fixed object image priority display is performed (i.e., service A) (S382). Accordingly, the list indicating the server-side display order is changed as shown in FIG. 20 (see region R4). Then, the server-side display order information of which order has been determined is stored as the multi-function device-side display order information to the storage unit 130 (S384).

The control unit 120 generates a screen using the multi-function device-side display order information stored in the storage unit 130 in S384 (S202 to S208), and the generated screen is displayed on the display unit 150 (S112). Accordingly, the screen as shown in FIG. 21 is displayed.

When the user selects the service A, the multi-function device 100 transmits operation result information, including the unique number '003', the key type representing the 'ENTER' key, and the determined information representing the service A, to the relay server 200.

When receiving the operation result information, including the unique number '003', the key type representing the 'ENTER' key, and the determined information representing the service A, the relay server 200 transmits the individual definition information having the unique number '004' (see FIG. 9D) to the multi-function device 100 according to the tree information and the undetermined table.

When receiving the individual definition information having the unique number '004', the multi-function device 100 displays a list screen (not shown) for enabling the user to select whether to use an upload service or download service of the service A.

When the user selects the download, the multi-function device 100 transmits operation result information, including the unique number '004', the key type representing the 'ENTER' key, and the determined information representing the download, to the relay server 200.

When receiving operation result information, including the unique number '004', the key type representing the 'ENTER' key, and the determined information representing the download, the relay server 200 transmits the individual definition information having the unique number '006' (see FIG. 9F) to the multi-function device 100 according to the tree information and the undetermined table.

When receiving the individual definition information having the unique number '006', the multi-function device 100 displays a list screen (not shown) for enabling the user to select whether to store the downloaded image data in a medium or to print the downloaded image data.

When the user selects to print the downloaded image data, the multi-function device 100 transmits operation result information, including the unique number '006', the key type representing the 'ENTER' key, and the determined information representing the printing, to the relay server 200.

When receiving the operation result information, including the unique number '006', the key type representing the 'ENTER' key, and the determined information representing the printing, the relay server 200 accesses the service providing server 300A for the service according to the tree information and the undetermined table. If communication with the service providing server 300A is normal, the relay server 200 acquires the thumbnails and data names of the image data stored in the service providing server 300A. Then, the relay server 200 transmits the individual definition information having the unique number '007' (see FIG. 9G) to the multi-function device 100. The individual definition information transmitted by the relay server 200 includes the thumbnails and data names of the image data stored in the service providing server 300. Meanwhile, if the communication with the service providing server 300A is erroneous, the relay server 200 transmits the individual definition information having the unique number '008' (see FIG. 9H) to the multi-function device 100.

When receiving the individual definition information having the unique number '007', the multi-function device 100 displays a list screen (see FIG. 10B) of the thumbnails of the image data for enabling the user to select image data to be downloaded.

When the user selects image data, the multi-function device 100 transmits individual definition information having the unique number '007', the key type representing the 'ENTER' key, and the determined information representing the data name of the image data selected by the user, to the relay server 200.

When receiving the individual definition information having the unique number '007', the key type representing the 'ENTER' key, and the determined information representing the data name of the image data selected by the user, the relay server 200 transmits the individual definition information having the unique number '009' (see FIG. 9I) to the multi-function device 100 according to the tree information and the undetermined table. The individual definition information transmitted by the relay server 200 includes the operation type representing that downloading will be executed, a parameter representing that the downloaded image data will be printed, and a parameter representing the data name of the image data selected by the user.

When receiving the individual definition information having the unique number '009', the multi-function device 100 downloads the image data of the data name included in the individual definition information, from the service providing server 300A, and prints the downloaded image data.

When the printing ends, the multi-function device 100 transmits the function operation end information including the unique number '009' to the relay server 200.

When receiving the function operation end information including the unique number '009', the relay server 200 transmits the standby instruction information to the multi-function device 100 in accordance the tree information.

When receiving the standby instruction information, the multi-function device 100 returns to the standby state.

On the other hand, when the receiving the individual definition information having the unique number '008', the multi-function device 100 displays a message screen (see FIG. 10C) for informing the user that the communication with the service providing server 300A has been erroneous.

When the user pushes the 'NEXT' key, the multi-function device 100 transmits operation result information including the unique number '008' and the key type representing the 'NEXT' key, to the relay server 200.

When receiving the operation result information including the unique number '008' and the key type representing the 'NEXT' key, the relay server 200 transmits the individual definition information having the unique number '003' (see FIG. 9C) to the multi-function device 100 according to the tree information.

As described above, the GUI for using the download service of the service A includes a basic configuration in which the relay server 200 transmits individual definition information to the multi-function device 100 according to the tree information and the undetermined table, and the multi-function device 100 displays various screens according to the individual definition information.

<Effects>

According to the present illustrative embodiment, it is unnecessary to transmit and receive a large amount of image data such as bitmap data representing screens displayed on the display unit 150 of the multi-function device 100 between the multi-function device 100 and the relay server 200 through the network 400. Specifically, it is unnecessary to transmit and receive image data representing a basic screen according to the screen type and various keys included in an image to be displayed between the multi-function device 100 and the relay server 200. Therefore, it is possible to reduce a communication load between the devices in screen display. The multi-function device 100 does not need to manage screen transitions and the relay server 200 does not need to manage the image data representing the basic screen according to the screen type and various keys included in then image to be displayed. According to this configuration, when predetermined operation such as operation of the 'ENTER' key is performed in the multi-function device 100, the relay server 200 can efficiently make a screen transition according to the predetermined operation only by transmitting individual definition information for instructing the multi-function device 100. Particularly, even when a plurality of multi-function devices 100 (for example, a multi-function device 100 which is a touch panel model and a multi-function device 100 which is a non-touch-panel model), since the relay server 200 does not need to manage basic screens according to the screen types of the plurality of multi-function devices 100 and various keys on purpose, it is possible to instruct the plurality of multi-function devices 100 having different configurations according to common individual definition information.

The relay server 200 designates the server-side display order (i.e., the order indicated by the list included in the individual definition information). In this case, when multiple objects images are displayed on the display unit 150 using the server-side display order as it is, the display order of an object image frequently selected by the user may be kept at a low level. In such case, useless screen moving operation (for example, screen switch operation with scroll operation, up/down key, and the like) is required in order for the user to search the object image of the selection target. Therefore, there is a problem in that it is troublesome to find the object image of the selection target, which may reduce the convenience of the user. According to the technique described in the present specification, multiple object images can be displayed on the display unit 150 in accordance with the multi-function device-side display order, which is the order obtained by rearranging the server-side display order designated by the relay server 200. Accordingly, multiple object images can be displayed in an easy-to-use manner for the user. Therefore, useless screen moving operation can be reduced, and accordingly, the convenience for the user can be improved. In addition, in a case that the drawing time of the object images takes a longer time than the display time of the texts, the user's waiting time can be reduced by arranging object images which are frequently selected by the user at the head side of the multiple object images displayed in the list format.

When multiple multi-function devices are connected to the relay server 200, the server-side display order is preferably configured not to be changeable by the user. This is because, when the server-side display order is frequently rearranged or object images are frequently added to the server-side display order and frequently deleted from the server-side display order, then, the display order of the object images frequently selected by the user is changed, and this may cause a problem in that it is troublesome for the user to find the object image of the selection target. According to the technique described in the present specification, the server-side display order received from the relay server 200 can be customize in an easy-to-use manner for the user, using the multi-function device-side display order information stored in the multi-function device 100. Therefore, it is not necessary to change the server-side display order stored in the relay server 200. This contributes to both the prevention of confusion among users and improvement in the convenience for the users.

By inputting change operation to the object image moving key K2 (S132: YES), the display order of multiple images can be changed (S134). Therefore, the display mode of multiple object images can be customized by the user. The user can update the display order of multiple object images with intuitive operation of touching the moving target object image, the moving key, and the like.

When the key for turning on the newly available item priority display (S34: ON), a new object image can be preferentially displayed on the display unit (S370, S382). Therefore, this can easily let the user recognize the existence of a new object image.

When change operation is input into the fixed display ON/OFF switch key K5 (S132: YES), an object image with which the fixed object image priority display is performed can be set (S134). Accordingly, the object image with which the fixed object image priority display is performed can be one of multiple object images that is most easily recognized by the user.

The object image with which the fixed object image priority display is performed can be set using the fixed object identification information stored in the storage unit 130. Accordingly, an object image with which the fixed object image priority display is performed can be defined in advance. In addition, before the multi-function device 100 is shipped, the fixed object identification information can be stored to the storage unit 130. Accordingly, a manufacturer of the multi-function device 100 can define the object image with which the fixed object image priority display is performed.

An object image that is more frequently selected by the user is preferentially displayed on the display unit (S348). Accordingly, the display order of multiple object images can be automatically customized in an easy-to-use manner for the user.

<Modification>

In the present illustrative embodiment, the case that a character string (for example, service A) is displayed on an object image has been explained, but the embodiment is not limited thereto. The technique disclosed in this specification can also be applied to a case that an image such as a thumbnail image is displayed on an object image. Alternatively, information for identifying an image such as a thumbnail image (for example, a filename of an image) may be used as the object image identification information.

In the above description, an example in which the multi-function device 100 is configured to perform communication with the relay server 200 has been described. The above-mentioned processes executed by the relay server 200 may be executed by at least any one of the service providing servers 300A to 300F. In this case, the relay server 200 may be omitted.

The network 400 may be a network such as a LAN other than the Internet network. The data communication can use not only the HTTP/1.1 but also an HTTP other than the HTTP/1.1, a FTP or a unique protocol.

Figure 4:
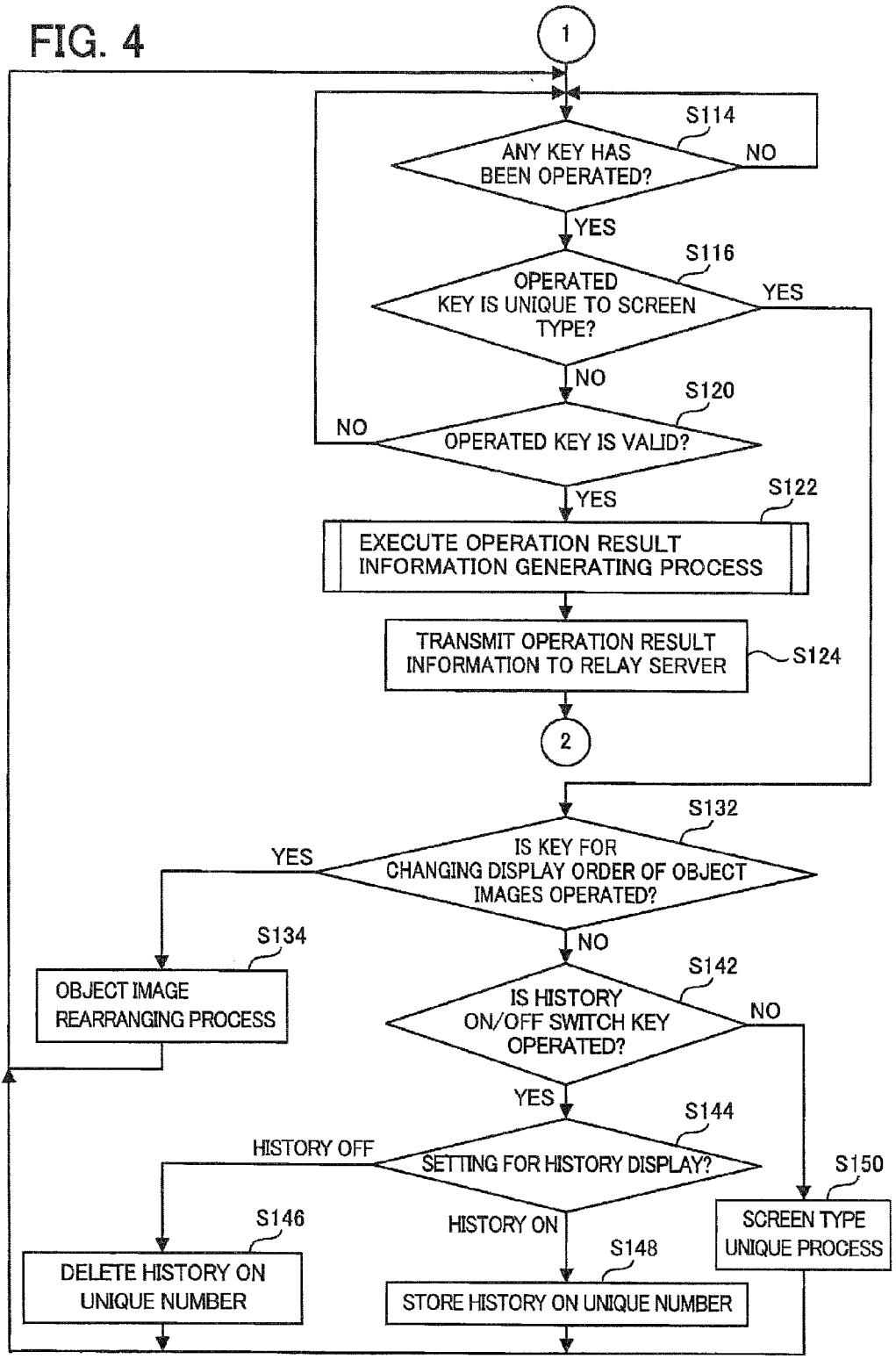
FIG. 4 is a flowchart illustrating the main processing executed by the multi-function device.
Figure 5:
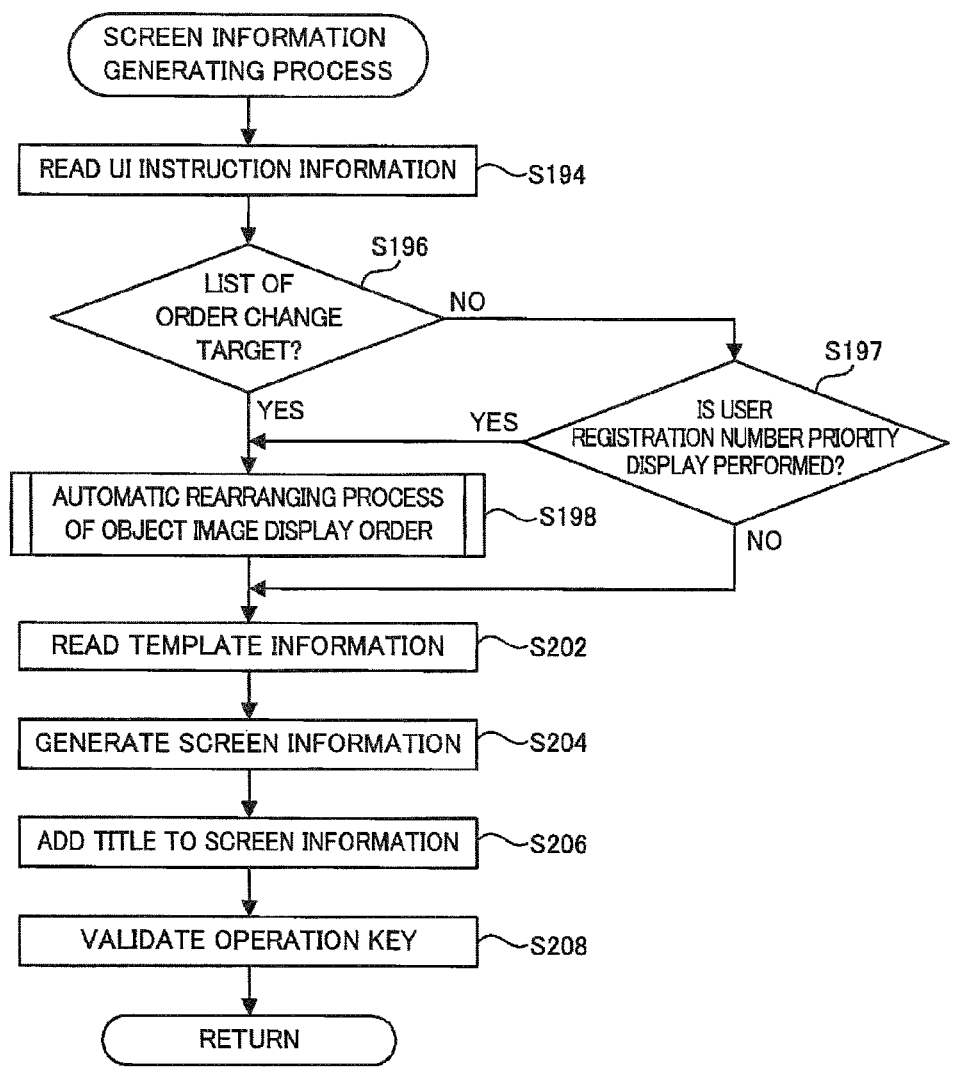
FIG. 5 is a flowchart illustrating image information generating process.

The multi-function device 100 may be configured such that the determination result in step S114 of the main process of the multi-function device 100 shown in FIG. 4 becomes positive (Yes in step S114) only when the operation key validated in the screen information generating process of step S208 shown in FIG. 5, that is, the key unique to the screen type is operated. For example, in a case of a touch panel model, a touch panel may be controlled such that, even when a position other than the position of the operation key validated in the screen information generating process of step S208 shown in FIG. 5, that is, the key unique to the screen type is touched, the touch is not detected. In a case of a non-touch-panel model, the operation unit 180 may be controlled such that, even when a hard key other than a hard key validated in step S208, the operation is not detected. In the case of the non-touch-panel model, the control unit 120 may instruct an audio output unit (not shown) to output a rejection tones when a hard key other than the hard key validated in step S208 is operated.

The multi-function device 100 having the printing function, the scanner function, a copy function, and the fax function has been exemplified; however, a device capable of using the configuration of the present illustrative embodiment may be another device different from the multi-function device 100. For example, office devices such as a printer, a scanner, a copy machine, and a facsimile, mobile terminals such as a portable phone, a PDA, and a headmounted display, AV products such as a camera, a player, and a television set, home appliances such as a phone, a digital photo frame, a microwave, and a refrigerator, medical devices, and the like can employ the configuration of the present illustrative embodiment. A device to which the configuration of the present illustrative embodiment is applied may include multiple displays as display units. An example of device having multiple displays includes a foldable mobile terminal having a display on the surface of the cover and a display on the inside of the cover.

The invention claimed is:

1. A terminal device comprising:
a communication unit configured to connect with a network;
an operation reception unit;
a storage unit;
a display unit configured to display various kinds of images; and
a control device configured to perform:
receiving, via the communication unit, screen data from a server which is connected with the network, the screen data indicating one of a plurality of display screens, and each of the display screens displaying a plurality of object images;
receiving, via the communication unit, server-side display order information transmitted from the server, the server-side display order information indicating a server-side display order, designated on a server side, of a plurality of object images included in the display screen displayed on the display unit, and the server-side display order information being assigned to each of the plurality of display screens;
storing terminal device-side display order information in the storage unit when a predetermined operation is received via the operation reception unit, the terminal device-side display order information being generated for each of the plurality of display screens, the terminal device-side display order information indicating a terminal device-side display order which is an order different from the server-side display order;
displaying, in the display screen, the plurality of object images in accordance with the server-side display order when the storage unit is not storing the terminal device-side display order information regarding the received screen data;
displaying, in the display screen, the plurality of object images in accordance with the terminal-side display order when the storage unit is storing the terminal device-side display order information regarding the received screen data;
determining whether or not a specific object image is selected from among the plurality of object images, the specific object image being an image for accepting an instruction for switching the display screen; and
sending requirement information to the server, via the communication unit, when it is determined that the specific object image is selected, the requirement information being information for requiring the server to send, to the terminal, screen data indicating a new display screen,
wherein the screen data indicating the new display screen is received from the server in response to the requirement information being sent, and the displaying of the plurality of object images in accordance with the server-side display order and the displaying of the plurality of object images in accordance with the terminal-side display order include displaying, in the display screen, the plurality of object images for the new display screen.

2. The terminal device according to claim 1, wherein
the storage unit stores first identification information for identifying an object display screen from among the plurality of display screens,
the object display screen is a screen for displaying the plurality of object images in accordance with the terminal-side display order,
the receiving of the screen data includes receiving the screen data and second identification information identifying the screen data,
the displaying of the plurality of object images in accordance with the terminal-side display order includes displaying the plurality of object images in accordance with the terminal-side display order, when the first identification information stored in the storage unit is identical to the received second identification information.

3. The terminal device according to claim 2, wherein
the terminal device-side display order information includes a plurality of types of terminal device-side display order information,
the storage unit is configured to store type information in association with the first identification information,
the type information indicating what type of terminal device-side display order information is to be used,
the displaying of the plurality of object images in accordance with the terminal-side display order includes displaying the plurality of object images in accordance with the terminal-side display order that is indicated by a type of the terminal device-side display order information that is indicated by the type information, when the first identification information stored in the storage unit is identical to the received second identification information.

4. The terminal device according to claim 2, wherein the storing of the terminal device-side display order information includes storing, when the predetermined operation for inputting the terminal device-side display order is received, terminal device-side display order information indicating the received terminal device-side display order in the storage unit,
the terminal device-side display order information being stored in the storage unit in association with the first identification information identifying the display screen displayed on the display unit.

5. The terminal device according to claim 4, wherein the displaying of the plurality of object images in accordance with the terminal-side display order includes displaying a first object image for accepting the predetermined operation for inputting the terminal device-side display order, when the first identification information stored in the storage unit is identical to the received second identification information.

6. The terminal device according to claim 4, wherein
the storing of the terminal device-side display order information includes storing first information and second information indicating in the storage unit in association with the first identification information identifying the display screen displayed on the display unit, when the predetermined operation for selecting a moving target object image and the predetermined operation for inputting a display order of the moving target object image are received, the first information indicating the moving target object image, and the second information indicating the display order of the moving target object image, the displaying of the plurality of object images in accordance with the terminal-side display order includes displaying the plurality of object images in accordance with the first information and the second information, when the first information and the second information are in association with the first identification information and when the first identification information stored in the storage unit is identical to the received second identification information.

7. The terminal device according to claim 4, wherein
the control device is further configured to perform storing a number of times when each of the plurality of object images is selected, the storing of the terminal device-side display order information includes storing first instruction information in the storage unit in association with the first identification information identifying the display screen displayed on the display unit, when receiving the predetermined operation for instructing to sort the plurality of object images in an order such that the object image which have the greater number of times is displayed more preferentially than the object image which has the smaller number of times, the first instruction information being information for instructing the display unit to display the plurality of object images in accordance with the numbers of times, the displaying of the plurality of object images in accordance with the terminal-side display order includes displaying the plurality of object images in accordance with the first instruction information, when the first instruction information is in association with the first identification information and when the first identification information stored in the storage unit is identical to the received second identification information.

8. The terminal device according to claim 2, wherein
the control device is further configured to perform storing, in response to receiving of the screen data, object image identification information in association with identification information of the received screen data, the object image identification information being information for identifying each of the plurality of object images included in the received screen data, the storing of the terminal device-side display order information includes storing first instruction information in the storage unit in association with the first identification information identifying the display screen displayed on the display unit, when receiving the predetermined operation for instructing to execute a first processing, the first processing being a processing for displaying preferentially an object image that is newly added, and the first instruction information being information for instructing the display unit to execute the first processing, the control device is further configured to perform comparing first object image identification information and second object image identification information, when the first identification information stored in the storage unit is identical to the received second identification information, the first object image identification being information stored in the storage unit in association with the first identification information, the second object image identification being information included in the received screen data, the displaying of the plurality of object images in accordance with the terminal-side display order includes displaying a new object image more preferentially than the other object images than the new object image on the display unit, when it is determined by the comparing that the new object image is included in the plurality of object images indicated by the second object image identification information, the new object image is an image that is different from the plurality of object images indicated by the first object image identification information.

9. The terminal device according to claim 2, wherein
the control device is further configured to perform:
storing first procedure information in the storage unit, when a first operation input for selecting a first sorting procedure is accepted, the first procedure information indicating that the first sorting procedure is selected; and storing second procedure information in the storage unit, when a second operation input for selecting a second sorting procedure is accepted, the second procedure information indicating that the second sorting procedure is selected, the displaying of the plurality of object images in accordance with the terminal-side display order includes displaying the plurality of object images in accordance with the first sorting procedure, when the first procedure information is stored in the storage unit under the situation where the first identification information stored in the storage unit is identical to the received second identification information, and the displaying of the plurality of object images in accordance with the terminal-side display order includes displaying the plurality of object images in accordance with the second sorting procedure, when the second procedure information is stored in the storage unit under the situation where first identification information that is identical to the received second identification information is not stored in the storage unit.

10. A terminal device comprising:
a communication unit configured to connect with a network;
an operation reception unit;
a storage unit;
a display unit; and
a control device configured to perform:
receiving, via the communication unit, screen data from a server which is connected with the network,
the screen data indicating one of a plurality of display screens;
receiving, via the communication unit, server-side display order information transmitted from the server,
the server-side display order information indicating a server-side display order, designated on a server side, of a plurality of object images included in the display screen displayed on the display unit,
the display unit being configured to display various kinds of images;
storing terminal device-side display order information in the storage unit when a predetermined operation is received via the operation reception unit,
the terminal device-side display order information indicating a terminal device- side display order which is an order different from the server-side display order;

displaying, in the display screen, the plurality of object images in accordance with the server-side display order when the storage unit is not storing the terminal device-side display order information;
displaying, in the display screen, the plurality of object images in accordance with the terminal-side display order when the storage unit is storing the terminal device-side display order information;
determining whether or not a specific object image is selected from among the plurality of object images, the specific object image being an image for accepting an instruction for switching the display screen; and
sending requirement information to the server via the communication unit,
the requirement information being information for requiring the server to send, to the terminal device, screen data indicating a new display screen,
wherein the terminal device-side display order is determined according one or more of a first order determination procedure and a second order determination procedure,
the displaying of the plurality of object images in accordance with the terminal-side display order includes displaying, on the display unit, a first object image for accepting a selection of the first order determination procedure and a second object image for accepting a selection of the second order determination procedure,
the storing of the terminal device-side display order information includes storing the first order determination procedure in the storage unit, when the predetermined operation for selecting the first object image is received,
the storing of the terminal device-side display order information includes storing the second order determination procedure in the storage unit, when the predetermined operation for selecting the second object image is received, and
the displaying of the plurality of object images in accordance with the terminal-side display order includes:
determining the terminal device-side display order by using the first order determination procedure when the storage unit stores the first order determination procedure;
determining the terminal device-side display order by using the second order determination procedure when the storage unit stores the second order determination procedure; and
displaying the plurality of object images in the display unit in accordance with the determined terminal-side display order.

11. The terminal device according to claim 10, wherein the first order determination procedure is that the terminal device-side display order of a priority object image selected by a user is set higher than the terminal device-side display order of the other object images,
the second order determination procedure is that the terminal device-side display order of the plurality of object images is determined in accordance with a predetermined rule,
the storing of the terminal device-side display order information includes storing priority object image identification information for identifying the priority object image and the first order determination procedure in the storage unit, when the predetermined operation for selecting the first object image and the priority object image is received,
the storing of the terminal device-side display order information includes storing the second order determination procedure in the storage unit, when the predetermined operation for selecting the second object image is received,
when the storage unit stores the first order determination procedure, the priority object image identification information and the second order determination procedure, the displaying of the plurality of object images in accordance with the terminal-side display order includes:
setting the terminal device-side display order of the priority object image to be the highest by using the first order determination procedure;
determining the terminal device-side display order of the other object images other than the priority object image by using the second order determination procedure; and
displaying the plurality of object images in the display unit in accordance with the determined terminal-side display order.

12. The terminal device according to claim 10, wherein the first order determination procedure is a procedure where the terminal device-side display order of a priority object image is set higher than the terminal device-side display order of the other object images,
priority object image identification information for identifying the priority object image is stored in the storage unit before the terminal device was shipped,
the second order determination procedure is that the terminal device-side display order of the plurality of object images is determined in accordance with a predetermined rule,
the storing of the terminal device-side display order information includes storing the first order determination procedure in the storage unit, when the predetermined operation for selecting the first object image is received,
the storing of the terminal device-side display order information includes storing the second order determination procedure in the storage unit, when the predetermined operation for selecting the second object image is received,
when the storage unit stores the first order determination procedure and the second order determination procedure, the displaying of the plurality of object images in accordance with the terminal-side display order includes:
setting the terminal device-side display order of the priority object image to be the highest by using the first order determination procedure;
determining the terminal device-side display order of the other object images other than the priority object image by using the second order determination procedure; and
displaying the plurality of object images in the display unit in accordance with the determined terminal-side display order.

13. The terminal device according to claim 10, wherein the first order determination procedure is a procedure where the terminal device-side display order of a new object image that is newly added is set higher than the terminal device-side display order of the other object images, the second order determination procedure is that the terminal device-side display order of the plurality of object images is determined in accordance with a predetermined rule, the storage unit stores first identification information for identifying an object display screen from among the plurality of display screens, the object display screen is a screen for displaying the plurality of object images in accordance with the terminal-side display order, the receiving of the screen data includes receiving the screen data and second identification information identifying the screen data, the control device is further configured to perform storing, in response to receiving of the screen data, object image identification information in association with identification information of the received screen data, the object image identification information being information for identifying each of the plurality of object images included in the received screen data, the storing of the terminal device-side display order information includes storing the first order determination procedure in the storage unit, when the predetermined operation for selecting the first object image is received, the storing of the terminal device-side display order information includes storing the second order determination procedure in the storage unit, when the predetermined operation for selecting the second object image is received, the control device is further configured to perform comparing first object image identification information and second object image identification information, when the first identification information stored in the storage unit is identical to the received second identification information, the first object image identification being information stored in the storage unit in association with the first identification information, and the second object image identification being information included in the received screen data, when it is determined by the comparing that the new object image is included in the plurality of object images indicated by the second object image identification information under the situation where the storage unit stores the first order determination procedure and the second order determination procedure, the displaying of the plurality of object images in accordance with the terminal-side display order includes:

setting the terminal device-side display order of the new object image to be the highest by using the first order determination procedure;

determining the terminal device-side display order of the other object images other than the new object image by using the second order determination procedure; and displaying the plurality of object images in the display unit in accordance with the determined terminal-side display order, the new object image is an image that is different from the plurality of object images indicated by the first object image identification information.

14. A terminal device comprising:
a communication unit configured to connect with a network;
an operation reception unit;
a storage unit;
a display unit; and
a control device configured to perform:
receiving, via the communication unit, screen data from a server which is connected with the network, the server being configured to communicate with a plurality of service providing devices,
the screen data indicating one of a plurality of display screens;
receiving, via the communication unit, server-side display order information transmitted from the server,
the server-side display order information indicating a server-side display order, designated on a server side, of a plurality of object images included in the display screen displayed on the display unit,
the display unit being configured to display various kinds of images;
storing terminal device-side display order information in the storage unit when a predetermined operation is received via the operation reception unit,
the terminal device-side display order information indicating a terminal device-side display order which is an order different from the server-side display order;
displaying, in the display screen, the plurality of object images in accordance with the server-side display order when the storage unit is not storing the terminal device-side display order information,
the plurality of object images including first type object images and second type object images,
each of the first type object images indicating a corresponding one of the plurality of service providing devices, and
each of the second type object images indicating a corresponding one of a plurality of services provided by the plurality of service providing devices;
determining whether or not the first type object image indicating a selected service providing device is selected from among the plurality of first type object images and whether or not the second type object image indicating a selected service is selected from among the plurality of second type object images;
sending first information to the server via the communication unit, when it is determined that the first type object image and the second type object image are selected,
the first information being information for indicating the selected service providing device and the selected service;
receiving use instruction information for instructing the terminal device to use the selected service provided by the selected service providing device;
using the selected service in accordance with the received use instruction information; and
acquiring user registration number information that indicates a number of registered users for each of the plurality of service providing devices,
wherein when the received screen data includes the first type object image and the second type object image, the displaying includes:
determining, in accordance with the acquired user registration number information, the terminal device-side display order of the first type object images such that the first type object image which indicates the service providing device having the greater number of registered users is set higher than the first type object image which indicates the service providing device having the smaller number of registered users; and displaying the plurality of first type object images in the display unit in accordance with the determined terminal-side display order.

\* \* \* \* \*